(12) United States Patent
Kobori et al.

(10) Patent No.: US 11,720,036 B2
(45) Date of Patent: Aug. 8, 2023

(54) TONER

(71) Applicant: CANON KABUSHIKI KAISHA, Tokyo (JP)

(72) Inventors: Takakuni Kobori, Ibaraki (JP); Kenta Mitsuiki, Ibaraki (JP); Hitoshi Sano, Chiba (JP); Wakiko Katsumata, Chiba (JP); Daisuke Yamashita, Chiba (JP); Yosuke Iwasaki, Tokyo (JP); Takeshi Ohtsu, Ibaraki (JP); Takaho Shibata, Tokyo (JP); Masaharu Miura, Ibaraki (JP); Koh Ishigami, Chiba (JP); Yuichi Mizo, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 17/344,544

(22) Filed: Jun. 10, 2021

(65) Prior Publication Data

US 2021/0397106 A1 Dec. 23, 2021

(30) Foreign Application Priority Data

Jun. 19, 2020 (JP) .................. 2020-106192

(51) Int. Cl.
  *G03G 9/087* (2006.01)
  *C08F 212/08* (2006.01)
  *G03G 9/08* (2006.01)

(52) U.S. Cl.
  CPC ........ *G03G 9/08711* (2013.01); *C08F 212/08* (2013.01); *G03G 9/0819* (2013.01); *G03G 9/08755* (2013.01)

(58) Field of Classification Search
  CPC ............. G03G 9/0819; G03G 9/08711; G03G 9/08755; G03G 9/08791; G03G 9/08797
  See application file for complete search history.

(56) References Cited

U.S. PATENT DOCUMENTS

| 5,424,810 A | 6/1995 | Tomiyama et al. |
| 5,464,722 A | 11/1995 | Tomiyama et al. |

(Continued)

FOREIGN PATENT DOCUMENTS

| JP | 2002-351148 A | 12/2002 |
| JP | 2006-145800 A | 6/2006 |
| JP | 2013-88686 A | 5/2013 |

OTHER PUBLICATIONS

U.S. Appl. No. 17/210,961, Kazuki Murata, filed Mar. 24, 2021.

(Continued)

*Primary Examiner* — Peter L Vajda
(74) *Attorney, Agent, or Firm* — Venable LLP

(57) ABSTRACT

A toner comprising a toner particle comprising a binder resin including a polyester resin, and a polyolefin resin having a sulfonic acid group, wherein the polyolefin resin having a sulfonic acid group is a polymer in which a vinyl polymer is bonded to a polyolefin, a content ratio of a monomer unit containing a sulfonic acid group in the vinyl polymer is from 1.0 mass % to 20.0 mass %, in a FT-IR spectrum obtained through measurement of a large particle size toner and a small particle size toner resulting from dividing, on a number basis, the toner into two substantially equal parts, a ratio of an intensity of a maximum absorption peak in a range from 1130 $cm^{-1}$ to 1170 $cm^{-1}$ with respect to an intensity of a maximum absorption peak in a range from 1713 $cm^{-1}$ to 1723 $cm^{-1}$ exhibits a specific relationship.

5 Claims, 1 Drawing Sheet

(56) References Cited

U.S. PATENT DOCUMENTS

| | | |
|---|---|---|
| 5,700,616 A | 12/1997 | Kasuya et al. |
| 5,712,073 A | 1/1998 | Katada et al. |
| 5,736,288 A | 4/1998 | Kasuya et al. |
| 5,972,553 A | 10/1999 | Katada et al. |
| 6,002,895 A | 12/1999 | Kasuya et al. |
| 6,007,957 A | 12/1999 | Kobori et al. |
| 6,156,471 A | 12/2000 | Kobori et al. |
| 6,203,959 B1 | 3/2001 | Tanikawa et al. |
| 6,235,441 B1 | 3/2001 | Tanikawa et al. |
| 6,653,036 B1 | 11/2003 | Tanikawa et al. |
| 6,670,087 B2 | 12/2003 | Fujikawa et al. |
| 7,147,981 B2 | 12/2006 | Fujikawa et al. |
| 7,279,262 B2 | 10/2007 | Fujikawa et al. |
| 7,288,348 B2 | 10/2007 | Hayami et al. |
| 7,396,626 B2 | 7/2008 | Fujikawa et al. |
| 7,396,629 B2 | 7/2008 | Baba et al. |
| 7,611,813 B2 | 11/2009 | Ida et al. |
| 7,629,100 B2 | 12/2009 | Okamoto et al. |
| 7,767,370 B2 | 8/2010 | Ishigami et al. |
| 7,833,687 B2 | 11/2010 | Kato et al. |
| 7,855,042 B2 | 12/2010 | Kobori et al. |
| 7,858,283 B2 | 12/2010 | Ishigami et al. |
| 7,906,262 B2 | 3/2011 | Ishigami et al. |
| 7,927,775 B2 | 4/2011 | Komatsu et al. |
| 7,939,233 B2 | 5/2011 | Inoue et al. |
| 8,114,562 B2 | 2/2012 | Ishigami et al. |
| 8,137,886 B2 | 3/2012 | Baba et al. |
| 8,288,069 B2 | 10/2012 | Fujikawa et al. |
| 8,298,742 B2 | 10/2012 | Okamoto et al. |
| 8,323,726 B2 | 12/2012 | Naka et al. |
| 8,697,327 B2 | 4/2014 | Shibata et al. |
| 8,921,023 B2 | 12/2014 | Baba et al. |
| 8,927,188 B2 | 1/2015 | Naka et al. |
| 8,945,805 B2 | 2/2015 | Baba et al. |
| 8,974,994 B2 | 3/2015 | Kamae et al. |
| 8,986,914 B2 | 3/2015 | Fujikawa et al. |
| 9,034,551 B2 | 5/2015 | Endo et al. |
| 9,057,970 B2 | 6/2015 | Ida et al. |
| 9,058,924 B2 | 6/2015 | Komatsu et al. |
| 9,063,443 B2 | 6/2015 | Ishigami et al. |
| 9,075,328 B2 | 7/2015 | Minagawa et al. |
| 9,152,088 B1 | 10/2015 | Kobori et al. |
| 9,348,247 B2 | 5/2016 | Ida et al. |
| 9,348,253 B2 | 5/2016 | Kanno et al. |
| 9,372,420 B2 | 6/2016 | Mizo et al. |
| 9,417,540 B2 | 8/2016 | Hashimoto et al. |
| 9,436,112 B2 | 9/2016 | Iwasaki et al. |
| 9,540,483 B2 | 1/2017 | Ida et al. |
| 9,651,883 B2 | 5/2017 | Hama et al. |
| 9,665,021 B2 | 5/2017 | Ohtsu et al. |
| 9,665,023 B2 | 5/2017 | Kamae et al. |
| 9,665,026 B2 | 5/2017 | Iwasaki et al. |
| 9,671,707 B2 | 6/2017 | Minagawa et al. |
| 9,696,644 B2 | 7/2017 | Ida et al. |
| 9,897,934 B2 | 2/2018 | Tamura et al. |
| 9,915,885 B2 | 3/2018 | Katsumata et al. |
| 9,969,834 B2 | 5/2018 | Ohtsu et al. |
| 10,012,918 B2 | 7/2018 | Ishigami et al. |
| 10,012,920 B2 | 7/2018 | Shibata et al. |
| 10,012,921 B2 | 7/2018 | Kamae et al. |
| 10,036,970 B2 | 7/2018 | Kanno et al. |
| 10,078,281 B2 | 9/2018 | Ida et al. |
| 10,082,743 B2 | 9/2018 | Hama et al. |
| 10,088,765 B2 | 10/2018 | Miyakai et al. |
| 10,133,201 B2 | 11/2018 | Kamae et al. |
| 10,146,146 B2 | 12/2018 | Komatsu et al. |
| 10,175,595 B2 | 1/2019 | Onozaki et al. |
| 10,197,936 B2 | 2/2019 | Onozaki et al. |
| 10,203,619 B2 | 2/2019 | Yamashita et al. |
| 10,216,108 B2 | 2/2019 | Iwasaki et al. |
| 10,228,629 B2 | 3/2019 | Tamura et al. |
| 10,234,777 B2 | 3/2019 | Ohtsu et al. |
| 10,401,748 B2 | 9/2019 | Hashimoto et al. |
| 10,423,090 B2 | 9/2019 | Ohtsu et al. |
| 10,451,986 B2 | 10/2019 | Sano et al. |
| 10,474,049 B2 | 11/2019 | Onozaki et al. |
| 10,642,178 B2 | 5/2020 | Yamashita et al. |
| 10,775,710 B1 | 9/2020 | Kamae et al. |
| 10,859,935 B2 | 12/2020 | Ohtsu et al. |
| 10,877,386 B2 | 12/2020 | Murayama et al. |
| 10,935,902 B2 | 3/2021 | Kanno et al. |
| 10,955,765 B2 | 3/2021 | Onozaki et al. |
| 2007/0238043 A1* | 10/2007 | Otake ............... G03G 9/0835 430/122.5 |
| 2010/0028796 A1 | 2/2010 | Nakamura et al. |
| 2010/0183971 A1 | 7/2010 | Fujikawa et al. |
| 2012/0214097 A1 | 8/2012 | Naka et al. |
| 2013/0108955 A1 | 5/2013 | Shibata et al. |
| 2013/0244159 A1 | 9/2013 | Ishigami et al. |
| 2013/0288173 A1 | 10/2013 | Hashimoto et al. |
| 2013/0309603 A1 | 11/2013 | Takahashi et al. |
| 2014/0134535 A1 | 5/2014 | Baba et al. |
| 2014/0137428 A1 | 5/2014 | Takenaka et al. |
| 2014/0329176 A1 | 11/2014 | Kanno et al. |
| 2015/0099227 A1 | 4/2015 | Ida et al. |
| 2016/0109820 A1 | 4/2016 | Hashimoto et al. |
| 2018/0052402 A1* | 2/2018 | Iwasaki ............ G03G 9/08755 |
| 2018/0275540 A1 | 9/2018 | Matsuo et al. |
| 2018/0314176 A1 | 11/2018 | Ikeda et al. |
| 2020/0057398 A1* | 2/2020 | Yamashita .......... G03G 9/0819 |
| 2020/0064751 A1 | 2/2020 | Murayama et al. |
| 2021/0055668 A1 | 2/2021 | Tamura et al. |
| 2021/0063903 A1 | 3/2021 | Shibata et al. |
| 2021/0141315 A1 | 5/2021 | Kamae et al. |
| 2021/0223710 A1 | 7/2021 | Takahashi et al. |
| 2021/0278774 A1 | 9/2021 | Hashimoto et al. |
| 2021/0278775 A1 | 9/2021 | Kamae et al. |

OTHER PUBLICATIONS

U.S. Appl. No. 17/210,974, Shin Kitamura, filed Mar. 24, 2021.
U.S. Appl. No. 17/334,192, Takakuni Kobori, filed May 28, 2021.
U.S. Appl. No. 17/336,397, Takaho Shibata, filed Jun. 2, 2021.
U.S. Appl. No. 17/383,033, Kazunari Ooyama, filed Jul. 22, 2021.

* cited by examiner

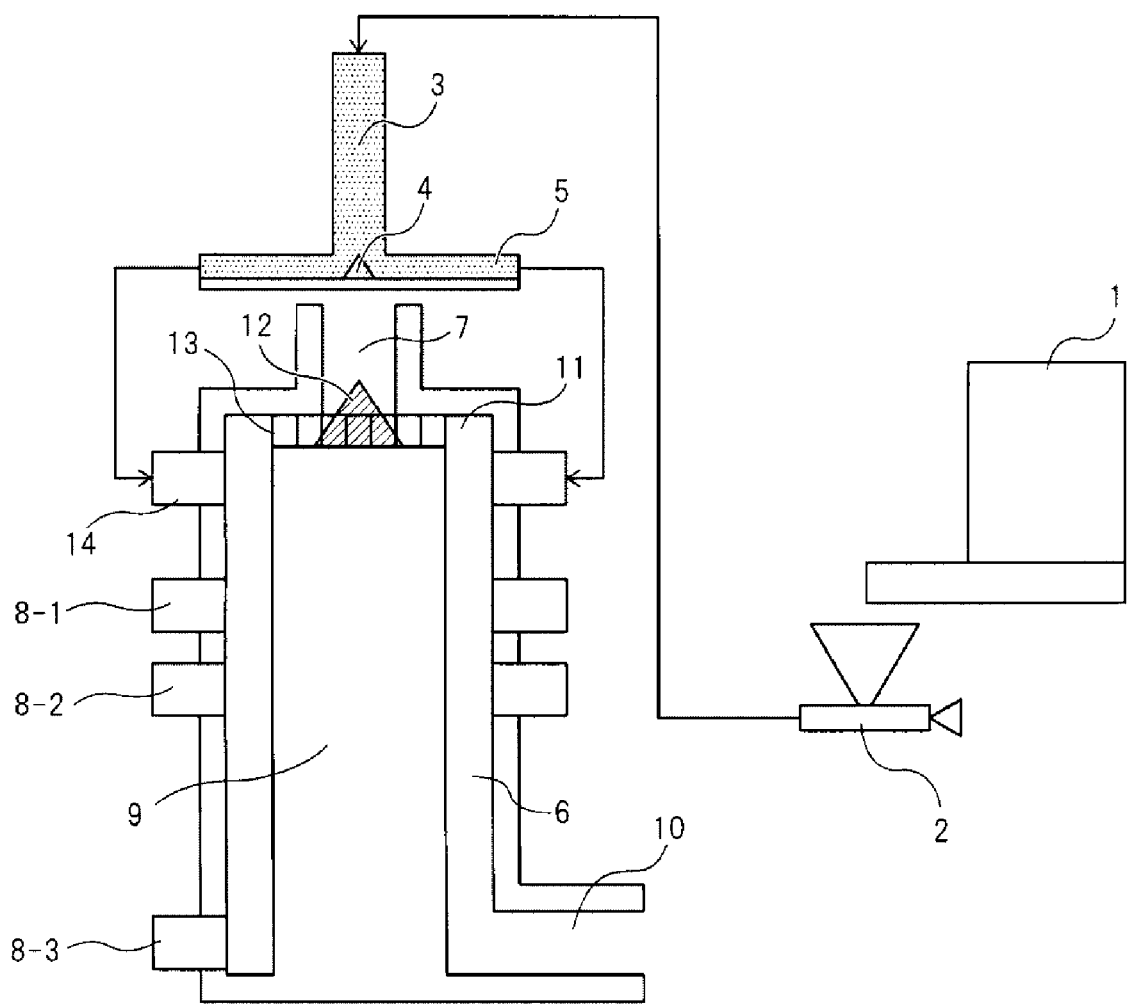

TONER

BACKGROUND OF THE INVENTION

Field of the Invention

The present invention relates to a toner that is used in electrophotographic systems, electrostatic recording systems and electrostatic printing systems.

Description of the Related Art

The growing spread of the use of electrophotographic full-color copiers in recent years has been accompanied by demands for not only higher speeds and higher image quality, but also further stabilization of image density. Toners of small particle size are demanded for the purpose of enhancing dot reproducibility, as a concrete measure for improving image quality.

Therefore, Japanese Patent Application Publication No. 2013-088686 proposes a toner having a small particle size and a sharp particle size distribution, in order to improve dot reproducibility. Japanese Patent Application Publication No. 2006-145800 proposes a toner in which a coverage ratio of silica fine particles is adjusted for each particle size range thereof, in order to improve charging performance and yield in toners that exhibit variability in particle size distribution. Further, Japanese Patent Application Publication No. 2002-351148 proposes a toner in which a resin containing sulfonic acid groups is added as a charge control agent for improving the charging performance of the toner.

SUMMARY OF THE INVENTION

A small particle size toner disclosed in Japanese Patent Application Publication No. 2013-088686 delivers favorable image quality in images outputted in normal-temperature, normal-humidity environments. Surface charge density is however constant, since the coverage ratio of a shell layer and inorganic fine particles is uniform, regardless of particle size. In consequence, the surface area decreases, and the charge quantity per toner particle decreases, as the toner particle size becomes smaller. This phenomenon is more pronounced in toner on the fine powder side of a particle size distribution of small particle size toners in high-temperature, high-humidity environments. In this case the charge quantity of the toner is small, and thus electric field followability is accordingly low.

It has been found that transferability of a toner may drop in some instances in a transfer step in an electrophotographic system, when attempting transfer from an electrostatic latent image bearing member to an intermediate transfer member or a medium by using an electric field. In AC development systems, moreover, forces derived from pull-back bias from the electrostatic latent image bearing member are weak, and hence the toner may remain adhered to the electrostatic latent image bearing member, whereby fogging may occur.

In the toner disclosed in Japanese Patent Application Publication No. 2006-145800 the coverage ratio of inorganic fine particles is adjusted for each particle size range, and therefore surface charge density varies with particle size. However, it has been found that transferability may drop, and fogging may occur more conspicuously, as a result of adjusting the coverage ratio so as to curtail the charging performance of the toner on the fine powder side.

A resin containing sulfonic acid groups is incorporated into the toner described in Japanese Patent Application Publication No. 2002-351148, to thereby increase charge quantity in high-temperature, high-humidity environments. The occurrence of fogging in this toner can be suppressed, since the charging ability of the toner as a whole, including also the fine powder side, can be improved. However, the charge quantity in low-temperature, low-humidity environments increases readily, and in particular the charge quantity becomes excessively large on a coarse powder side; it was found that, as a result, in some instances electrostatic attachment forces between the toner and a developer carrier increase, the developing performance in the electrostatic latent image bearing member drops, and image density decreases.

Such being the case a trade-off exists between favorable image density and transferability and fogging suppression, and there is thus an urgent need for developing toners that overcome the above trade-off and deliver excellent image quality. The present disclosure provides a toner having excellent image quality, transferability and image density, and suppressing fogging.

The present disclosure relates to a toner comprising a toner particle comprising a binder resin comprising a polyester resin, and a polyolefin resin having a sulfonic acid group, wherein the polyolefin resin having a sulfonic acid group is a polymer in which a vinyl polymer is bonded to a polyolefin;

a content ratio of a monomer unit containing a sulfonic acid group in the vinyl polymer is from 1.0 mass % to 20.0 mass %; and when the toner is divided, using a classifier of an inertial classification system, into two groups which are a first group including a large particle size toner and a second group including a small particle size toner so that the number of toner particles of the first group and the number of toner particles of the second group are substantially equal, Expression (1) is satisfied:

$$1.10 \leq (As/Bs)/(Al/Bl) \leq 2.00 \tag{1}$$

where As denotes a ratio of an intensity of a maximum absorption peak in a range from 1130 $cm^{-1}$ to 1170 $cm^{-1}$ assigned to a sulfonic acid group contained in the polyolefin resin with respect to an intensity of a maximum absorption peak in a range from 1713 $cm^{-1}$ to 1723 $cm^{-1}$ assigned to carbonyl in the polyester resin, in a FT-IR spectrum obtained through measurement of the second group in accordance with an ATR method, using Ge as an ATR crystal, and under a condition where an infrared light incidence angle is set to 45°;

Bs denotes a ratio of an intensity of a maximum absorption peak in a range from 1130 $cm^{-1}$ to 1170 $cm^{-1}$ assigned to a sulfonic acid group contained in the polyolefin resin with respect to an intensity of a maximum absorption peak in a range from 1713 $cm^{-1}$ to 1723 $cm^{-1}$ assigned to carbonyl in the polyester resin, in a FT-IR spectrum obtained through measurement of the second group in accordance with an ATR method, using diamond as an ATR crystal, and under a condition where an infrared light incidence angle is set to 45°;

Al denotes a ratio of an intensity of a maximum absorption peak in a range from 1130 $cm^{-1}$ to 1170 $cm^{-1}$ assigned to a sulfonic acid group contained in the polyolefin resin with respect to an intensity of a maximum absorption peak in a range from 1713 $cm^{-1}$ to 1723 $cm^{-1}$ assigned to carbonyl in the polyester resin, in a FT-IR spectrum obtained through measurement of the first group in accordance with an ATR method, using Ge as an ATR crystal, and under a condition where an infrared light incidence angle is set to 45°; and Bl denotes a ratio of an intensity of a maximum absorption peak in a range from 1130 cm$^{-1}$ to 1170 cm$^{-1}$ assigned to a sulfonic acid group contained in the polyolefin resin with respect to an intensity of a maximum absorption peak in a range from 1713 cm$^{-1}$ to 1723 cm$^{-1}$ assigned to carbonyl in the polyester resin, in a FT-IR spectrum obtained through measurement of the first group in accordance with an ATR method, using diamond as an ATR crystal, and under a condition where an infrared light incidence angle is set to 45°.

The present disclosure can provide a toner having excellent image quality, transferability and image density, and suppressing fogging. Further features of the present invention will become apparent from the following description of exemplary embodiments with reference to the attached drawings.

BRIEF DESCRIPTION OF THE DRAWINGS

The FIGURE is an example of a heat sphering treatment device.

DESCRIPTION OF THE EMBODIMENTS

Unless specifically indicated otherwise, expressions such as "from XX to YY" and "XX to YY" that show numerical value ranges refer to numerical value ranges that include the lower limit and upper limit that are the end points.

As pointed out above, small particle size toners such as that disclosed in Japanese Patent Application Publication No. 2013-088686 exhibit a trade-off between good image density, and transferability and fogging suppression, and have thus room for improvement in terms of image quality, image density, transferability and fogging suppression.

Therefore, the inventors further studied toners that exhibit excellent image quality, image density, transferability and fogging suppression. When the particle size of the toner is made smaller in order to improve image quality, the surface area per toner particle decreases, and charge quantity decreases as well. As a result, transferability drops and fogging occurs.

By contrast, transferability can be improved and fogging suppressed just by increasing the charge quantity of the toner, as conventionally proposed; however, electrostatic latent images become buried with a small amount of toner, which translates into in lower image density.

The inventors further studied toners exhibiting excellent image quality, image density, transferability and fogging suppression. The inventors addressed separately, and in detail, the forces that act on toner in an electric field between a developer carrier and an electrostatic latent image bearing member. The charge quantity of toner, which affects electric field strength dependence, is proportional to surface area, and hence decreases in proportion to the square of particle size, in cases where particle size is small. By contrast, non-electrostatic attachment forces on the electrostatic latent image bearing member are proportional to particle size, and hence reducing the particle size of toner results inevitably in lower developing performance, and in the occurrence of fogging.

That is, transferability can be improved and fogging can be suppressed just by increasing the charge quantity of conventionally proposed toners, in order to increase electric field flight forces in the toner; in this case, however, image density stability merely decreases, and the above trade-off cannot be overcome. Further studies by the inventors have revealed that the main factor underlying drops in transferability and the occurrence of fogging, and the main factor underlying drops in image density, can be traced to particles of dissimilar particle size in the particle size distribution of the toner.

Specifically, the main factor underlying drops in transferability and the occurrence of fogging is a fine powder having a low charge quantity per particle. Meanwhile, the main factor underlying drops in image density is charge quantity per mass, which is influenced by a coarse powder of large mass per particle. It has therefore been found that the above trade-off can be overcome by taking measures that address the charge quantity of respective particle.

The above toner contains a polyolefin resin having sulfonic acid groups. From among a first group including large particle size toner and a second group including small particle size toner, and resulting from dividing the toner into two substantially equal parts on a number basis, the polyolefin resin having sulfonic acid groups becomes localized in the vicinity of the surface of the toner particle to a greater degree in the case of the second group than in the case of the first group. As a result, the surface charge density of the same all particle size toner is further increased, and drops transferability and the occurrence of fogging, which are problems that accompany reductions in particle size, can be suppressed. Further, image density can be increased since the difference between the charge quantity of the small particle size toner and that of the first group is small.

That is, the present disclosure relates to a toner comprising a toner particle comprising a binder resin comprising a polyester resin, and a polyolefin resin having a sulfonic acid group, wherein the polyolefin resin having a sulfonic acid group is a polymer in which a vinyl polymer is bonded to a polyolefin;

a content ratio of a monomer unit containing a sulfonic acid group in the vinyl polymer is from 1.0 mass % to 20.0 mass %; and when the toner is divided, using a classifier of an inertial classification system, into two groups which are a first group including a large particle size toner and a second group including a small particle size toner so that the number of toner particles of the first group and the number of toner particles of the second group are substantially equal, Expression (1) is satisfied:

$$1.10 \leq (As/Bs)/(Al/Bl) \leq 2.00 \tag{1}$$

where As denotes a ratio of an intensity of a maximum absorption peak in a range from 1130 cm$^{-1}$ to 1170 cm$^{-1}$ assigned to a sulfonic acid group contained in the polyolefin resin with respect to an intensity of a maximum absorption peak in a range from 1713 cm$^{-1}$ to 1723 cm$^{-1}$ assigned to carbonyl in the polyester resin, in a FT-IR spectrum obtained through measurement of the second group in accordance with an ATR method, using Ge as an ATR crystal, and under a condition where an infrared light incidence angle is set to 45°;

Bs denotes a ratio of an intensity of a maximum absorption peak in a range from 1130 cm$^{-1}$ to 1170 cm$^{-1}$ assigned to a sulfonic acid group contained in the polyolefin resin with respect to an intensity of a maximum absorption peak in a range from 1713 cm$^{-1}$ to 1723 cm$^{-1}$ assigned to carbonyl in the polyester resin, in a FT-IR spectrum obtained through measurement of the second group in accordance with an ATR method, using diamond as an ATR crystal, and under a condition where an infrared light incidence angle is set to 45°;

Al denotes a ratio of an intensity of a maximum absorption peak in a range from 1130 cm$^{-1}$ to 1170 cm$^{-1}$ assigned to a sulfonic acid group contained in the polyolefin resin with respect to an intensity of a maximum absorption peak in a range from 1713 cm$^{-1}$ to 1723 cm$^{-1}$ assigned to carbonyl in the polyester resin, in a FT-IR spectrum obtained through measurement of the first group in accordance with an ATR method, using Ge as an ATR crystal, and under a condition where an infrared light incidence angle is set to 45°; and Bl denotes a ratio of an intensity of a maximum absorption peak in a range from 1130 cm$^{-1}$ to 1170 cm$^{-1}$ assigned to a sulfonic acid group contained in the polyolefin resin with respect to an intensity of a maximum absorption peak in a range from 1713 cm$^{-1}$ to 1723 cm$^{-1}$ assigned to carbonyl in the polyester resin, in a FT-IR spectrum obtained through measurement of the first group in accordance with an ATR method, using diamond as an ATR crystal, and under a condition where an infrared light incidence angle is set to 45°.

The toner comprises a toner particle containing a polyolefin resin having sulfonic acid groups (sulfo groups).

The polyolefin resin having sulfonic acid group is a polymer in which a vinyl polymer is bonded to a polyolefin. The vinyl polymer comprises a monomer unit having a sulfonic acid group. The content ratio of the monomer unit having a sulfonic acid group in the vinyl polymer is from 1.0 mass % to 20.0 mass %.

By setting the content ratio of the monomer unit having a sulfonic acid group to 1.0 mass % or higher, charging performance is maintained also in high-temperature, high-humidity environments, on account of the negative charge derived from the sulfonic acid groups.

By setting the content ratio of the monomer unit having a sulfonic acid group to be 20.0 mass % or lower it becomes possible to suppress charge-up in low humidity environments, and accordingly electrostatic attachment forces are reduced, and developing performance is improved.

The content ratio of the monomer unit having a sulfonic acid group in the vinyl polymer is preferably from 5.0 mass % to 15.0 mass %, more preferably from 8.0 mass % to 12.0 mass %.

The content ratio of the monomer units having a sulfonic acid group in the vinyl polymer is preferably from 1 mol % to 12 mol %, more preferably from 3 mol % to 12 mol %, and yet more preferably from 6 mol % to 12 mol %, relative to all monomer units that make up the vinyl polymer.

The term monomer unit denotes a form resulting from reaction of a monomer substance in a polymer. The monomer units containing a sulfonic acid group is contained in a vinyl polymer. Preferably, the monomer unit in the vinyl polymer is each one carbon-carbon bond section within a main chain, of the polymer, resulting from polymerization of vinylic monomers. For example, the vinylic monomers can be represented by Formula (A) below.

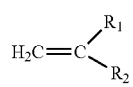

(A)

(In Formula (A), $R_1$ represents a hydrogen atom or an alkyl group (preferably, a C1 to C3 alkyl group, and more preferably, a methyl group) and $R_2$ represents an arbitrary substituent.)

The toner is divided substantially evenly in two, on a number basis, into a first group including large particle size toner and a second group including small particle size toner, using a classifier of an inertial classification system. As a characterizing feature of a polyolefin resin that has monomer units having a sulfonic acid group with the above characterizing charging characteristics becomes concentrated to a greater extent, in the vicinity of the toner surface, in the second group (small particle size-side particle group) than in the first group (large particle size-side particle group).

The charge quantity of the second group, which has a low charge quantity per particle, can be made relatively higher as a result, which in turn allows making sharper the charge distribution of the toner.

Specifically, when the toner is divided, using a classifier of an inertial classification system, into two groups being a first group including large particle size toner and a second group including small particle size toner so that the number of toner particles of the first group and the number of toner particles of the second group are substantially equal, Expression (1) is satisfied $$1.10 \leq (As/Bs)/(Al/Bl) \leq 2.00 \tag{1}$$

where As denotes a ratio (sulfonic acid group/carbonyl) of the intensity of a maximum absorption peak in a range from 1130 cm$^{-1}$ to 1170 cm$^{-1}$ assigned to sulfonic acid groups contained in the polyolefin resin with respect to the intensity of a maximum absorption peak in a range from 1713 cm$^{-1}$ to 1723 cm$^{-1}$ assigned to carbonyl in the polyester resin, in a FT-IR spectrum obtained through measurement of the second group in accordance with an ATR method, using Ge as an ATR crystal, and under a condition where an infrared light incidence angle is set to 45°;

Bs denotes a ratio of the intensity of a maximum absorption peak in a range from 1130 cm$^{-1}$ to 1170 cm$^{-1}$ assigned to sulfonic acid groups contained in the polyolefin resin with respect to the intensity of a maximum absorption peak in a range from 1713 cm$^{-1}$ to 1723 cm$^{-1}$ assigned to carbonyl in the polyester resin, in a FT-IR spectrum obtained through measurement of the second group in accordance with an ATR method, using diamond as an ATR crystal, and under a condition where an infrared light incidence angle is set to 45°;

Al denotes a ratio of the intensity of a maximum absorption peak in a range from 1130 cm$^{-1}$ to 1170 cm$^{-1}$ assigned to sulfonic acid groups contained in the polyolefin resin with respect to the intensity of a maximum absorption peak in a range from 1713 cm$^{-1}$ to 1723 cm$^{-1}$ assigned to carbonyl in the polyester resin, in a FT-IR spectrum obtained through measurement of the first group in accordance with an ATR method, using Ge as an ATR crystal, and under a condition where an infrared light incidence angle is set to 45°; and Bl denotes a ratio of the intensity of a maximum absorption peak in a range from 1130 cm$^{-1}$ to 1170 cm$^{-1}$ assigned to sulfonic acid groups contained in the polyolefin resin with respect to the intensity of a maximum absorption peak in a range from 1713 cm$^{-1}$ to 1723 cm$^{-1}$ assigned to carbonyl in the polyester resin, in a FT-IR spectrum obtained through measurement of the first group in accordance with an ATR method, using diamond as an ATR crystal, and under a condition where an infrared light incidence angle is set to 45°.

Herein As (measurement of the second group in the toner) and Al (measurement of the first group in the toner) are indices pertaining to the abundance ratio of the polyolefin resin having sulfonic acid groups with respect to the polyester resin, at about 0.3 µm from the toner surface in the depth direction of the toner, being a direction from the toner surface towards a central portion of the toner.

Meanwhile, Bs and Bl are indices pertaining to the abundance ratio of the polyolefin resin having sulfonic acid groups with respect to the polyester resin, at about 1.0 µm from the toner surface in the depth direction.

Given that As/Bs is a coefficient pertaining to a ratio of a composition distribution with respect to the depth direction from the toner surface, then a value of the coefficient being higher than 1.00 signifies that the polyolefin resin having sulfonic acid groups is more concentrated in the vicinity of the surface.

Therefore, a value of 1.10 or higher of a ratio of As/Bs in the second group of the toner with respect to Al/Bl in the first group of the toner signifies herein that a resin that improves the above charging performance can become more concentrated in the vicinity of the surface of toner having a small particle size, among the toner groups.

As a result, the charge quantity of the second group, having a low charge quantity per particle, can be made relatively higher, which in turn allows the charge distribution of the toner to be made sharper.

By setting on the other hand the ratio of As/Bs relative to Al/Bl to 2.00 or less, the charge quantity of toner on the small particle size side can be prevented from becoming excessively high, and the charge distribution can be made sharper.

The ratio (As/Bs)/(Al/Bl) lies preferably in the range from 1.50 to 2.00, and more preferably from 1.60 to 1.90.

A sufficient effect can be achieved so long as the provisions of the present invention are satisfied by the particle groups resulting from dividing in two so that the difference between the numbers of particles of the first group and of the second group is 4% or less. Accordingly, the wording "divided into two substantially equal parts" in the present invention signifies division in two so that the difference in the numbers of particles is 4% or less.

The method for calculating As, Bs, Al and Bl is as follows.

Firstly, the toner is divided into two substantially equal parts, on a number basis, i.e. into the first group of large particle size and the second group on the small particle size side, using an Elbow-jet classifier (by Nittetsu Mining Co., Ltd.) of an inertial classification system.

To divide the toner in two, a feed amount/fine powder classification edge as an operation condition of the Elbow-jet is optimized, and a coarse powder classification edge is closed at maximum, to thereby divide the toner into two substantially equal parts corresponding the first group being the large particle size side and the second group being the small particle size side. A concrete method is described next.

To set the operation conditions of the Elbow-jet, firstly an air quantity control valve is adjusted so that air flow is identical on the large particle size side and on the small particle size side, and then the fine powder classification edge is displaced, to work out a position at which a difference in the numbers of particles distributed between the large particle size side and the small particle size side is about 8%. Thereafter, the fine powder classification edge is fixed at that position, and the air quantity control valves on the large particle size side and on the small particle size side are fine-tuned, so that the first group being the large particle size side and the second group being the small particle size side are divided into two substantially equal parts, on a number basis (so that a difference in the numbers of respective particles is 4% or less). At this time for instance the feed amount can be set to 5 kg/hr, and the distance between the wall within the Elbow-jet on the fine powder passage side and the tip of the fine powder classification edge is 10 to 15 mm.

Next, the above ratios can be calculated by performing the below-described ATR measurements for the classified first group and second group.

In an ATR (Attenuated Total Reflection) method, a sample is brought into close contact with a crystal (ATR crystal) of higher refractive index than that of the sample, and infrared light is caused to strike the crystal at an incidence angle equal to or greater than a critical angle. Thereupon, the incident light repeatedly undergoes total reflection at the interface between the crystal and the sample closely adhered thereto, and exits then the crystal. Instead of being reflected at the interface between the sample and the crystal, thus, the infrared light becomes totally reflected after having penetrated somewhat into the sample. This penetration depth depends on the wavelength, the incidence angle, and the refractive index of the ATR crystal.

$$d_p = \lambda/(2\pi n_1) \times [\sin^2\theta - (n_1/n_2)^2]^{-1/2}$$

$d_p$: penetration depth
$n_1$: refractive index of sample (1.5 in the present disclosure)
$n_2$: refractive index of ATR crystal (4.0 in a case where the ATR crystal is Ge, 2.4 in a case where the ATR crystal is diamond)
$\theta$: incidence angle Accordingly, FT-IR spectra at different penetration depths can be obtained by modifying the refractive index and the incidence angle of the ATR crystal. This characteristic is exploited to determine an index pertaining to the abundance ratio of the polyolefin resin having a sulfonic acid group in the vicinity of the toner surface. The degree of uneven distribution of the polyolefin resin having a sulfonic acid group in the depth direction of the toner, from the toner surface toward the central portion of the toner, is thus quantified as an index.

In a case where in the ATR method Ge ($n_2$=4.0) is used as the ATR crystal, under conditions of light of 2000 $cm^{-1}$ ($\lambda$=5 µm) and incidence angle of 45°, the above expression yields a penetration depth $d_p$ of about 0.3 µm. On the other hand the penetration depth is about 1.0 µm in a case where diamond ($n_2$=2.4) is used as the ATR crystal, with a measurement under a condition of incidence angle of 45°.

Specifically, the intensity of a maximum absorption peak in a range from 1130 $cm^{-1}$ to 1170 $cm^{-1}$ relative to an intensity of 1.00 of the maximum absorption peak in a range from 1713 $cm^{-1}$ to 1723 $cm^{-1}$ is labeled As (toner in the second group) and Al (toner in the first group) in a FT-IR spectrum of toner that can be obtained through measurement in accordance with an ATR method, using Ge ($n_2$=4.0) as an ATR crystal, and under a condition where an infrared light incidence angle is set to 45°.

The intensity of a maximum absorption peak in a range from 1130 $cm^{-1}$ to 1170 $cm^{-1}$ relative to an intensity of 1.00 of the maximum absorption peak in a range from 1713 $cm^{-1}$ to 1723 $cm^{-1}$, is labeled Bs (toner in the second group) and Bl (toner in the first group), in a FT-IR spectrum of toner that can be obtained through measurement in accordance with an ATR method, using diamond as an ATR crystal, and under a condition where an infrared light incidence angle is set to 45°.

The maximum absorption peak in a range from 1713 cm$^{-1}$ to 1723 cm$^{-1}$ derives from stretching vibration of —CO—, which is a carbonyl group, in the polyester resin.

The maximum absorption peak in a range of from 1130 cm$^{-1}$ to 1170 cm$^{-1}$ derives from stretching vibration of sulfonyl group in the polyolefin resin having a sulfonic acid group. The larger this peak, the higher is the surface abundance ratio of the polyolefin resin that is denoted thereby.

A detailed procedure of the ATR method is described further on.

Herein, As is preferably 0.10 to 0.40, and more preferably 0.20 to 0.40. Further, Bs is preferably 0.10 to 0.30, and more preferably 0.10 to 0.20. Further, Al is preferably 0.10 to 0.30, and more preferably 0.10 to 0.20. Next, Bl is preferably 0.10 to 0.30, and more preferably 0.10 to 0.20.

The ratio As/Bs is preferably 1.10 to 2.20, and more preferably 1.50 to 2.10. The ratio Al/Bl is preferably 0.50 to 1.50, and more preferably 0.80 to 1.10.

Methods such as those described below may be illustrated as means for causing the polyolefin resin having a sulfonic acid group to be present to greater extent in the vicinity of the surfaces of particles in the second group (small particle size toner) than in the vicinity of the surfaces of particles in the first group (large particle size toner). For instance, such a method may involve modifying the addition amount of the polyolefin resin having a sulfonic acid group, for imparting charge retention properties, between large particle size side toner and small particle size side toner, or may be a method that involves modifying the abundance ratio at a surface layer between the large particle size side toner and the small particle size side toner, in a core-shell formation step.

A chemical toner production method such as emulsion aggregation can be used as the core-shell formation step; alternatively, a dry-type heat sphering production method may be resorted which relies on formation of a spontaneous shell layer as a result of a below-described thermal treatment. Among the foregoing, in a dry-type heat sphering production method, relying on formation of a spontaneous shell layer as a result of a thermal treatment, the polyolefin resin can be concentrated in the vicinity of the surface, with a diffusion distance that becomes shorter as the particle size of the toner decreases. As a result a toner can be obtained conveniently that satisfies the above prescriptions, without mixing toners produced in accordance with dissimilar formulations.

The number-basis median diameter D50 of the toner is preferably from 3.0 μm to 6.0 μm. A span value denoting the particle diameter distribution of the toner, and obtained in accordance with the Expression (2) below, is preferably from 0.7 to 2.0.

$$\text{Span value} = (D90 - D10)/D50 \quad (2)$$

In Expression (2), D90 is the particle diameter of toner at which a cumulative number of particles in increasing order of particle diameter is 90%, while D10 is the particle diameter of toner at which a cumulative number of particles in increasing order of particle diameter is 10%.

Transferability is improved, and fogging suppressed, by virtue of the fact that D50 is 3.0 μm or larger. Meanwhile image quality is improved by virtue of the fact that D50 is 6.0 μm or smaller. The above mentioned effect of can be significantly brought about thanks to the span value being 0.7 or larger. Also, transferability is improved and fogging suppressed by virtue of the fact that the span value is 2.0 or smaller.

More preferably, D50 is from 3.0 μm to 5.5 μm, and yet more preferably from 3.0 μm to 5.0 μm. Yet better dot reproducibility is achieved and superior image quality is obtained as a result. More preferably, the span value is from 1.1 to 2.0. Herein D10, D50, and D90 can be measured using a particle diameter distribution analyzer (Coulter Multisizer III: by Beckman Coulter, Inc.) in accordance with the Coulter method. The details are described further on.

D10, D50, and D90 of the toner are calculated by using a precision particle diameter distribution measuring apparatus "Coulter Counter Multisizer 3" (registered trademark, manufactured by Beckman Coulter, Inc.) equipped with a 100-μm aperture tube having a pore size and based on a pore electric resistance method and also the dedicated software "Beckman Coulter Multisizer 3 Version 3.51" (manufactured by Beckman Coulter, Inc.) for setting measurement conditions and performing measurement data analysis, performing the measurement with 25,000 effective measurement channels, and analyzing the measurement data.

A solution prepared by dissolving special grade sodium chloride in deionized water to a concentration of about 1% by mass, for example, "ISOTON II" (manufactured by Beckman Coulter, Inc.), can be used as the electrolytic aqueous solution to be used for measurements.

The dedicated software is set up in the following manner before the measurement and analysis.

The total count number in a control mode is set to 50,000 particles on a "CHANGE STANDARD MEASUREMENT METHOD (SOM) SCREEN" in the dedicated software, the number of measurements is set to 1, and a value obtained using "standard particles 10.0 m" (manufactured by Beckman Coulter, Inc.) is set as a Kd value. The threshold and the noise level are automatically set by pressing the measurement button of the threshold/noise level. Further, the current is set to 1600 μA, the gain is set to 2, the electrolytic solution is set to ISOTON II, and "FLUSH OF APERTURE TUBE AFTER MEASUREMENT" is checked.

In the "PULSE TO PARTICLE DIAMETER CONVERSION SETTING SCREEN" of the dedicated software, the bin interval is set to a logarithmic particle diameter, the particle diameter bin is set to a 256-particle diameter bin, and a particle diameter range is set from 2 m to 60 m.

A specific measurement method is described (1) to (7) hereinbelow.

(1) Approximately 200 mL of the electrolytic aqueous solution is placed in a glass 250 mL round-bottom beaker dedicated to Multisizer 3, the beaker is set in a sample stand, and stirring with a stirrer rod is carried out counterclockwise at 24 rpm. Dirt and air bubbles in the aperture tube are removed by the "FLUSH OF APERTURE TUBE" function of the dedicated software.

(2) Approximately 30 ml of the electrolytic aqueous solution is placed in a glass 100 mL flat-bottom beaker. Then, about 0.3 mL of a diluted solution obtained by 3-fold mass dilution of "CONTAMINON N" (10% by mass aqueous solution of a neutral detergent for washing precision measuring instruments of pH 7 consisting of a nonionic surfactant, an anionic surfactant, and an organic builder, manufactured by Wako Pure Chemical Industries, Ltd.) with deionized water is added.

(3) A predetermined amount of deionized water is placed in the water tank of an ultrasonic disperser "Ultrasonic Dispersion System Tetora 150" (manufactured by Nikkaki Bios Co., Ltd.) with an electrical output of 120 W in which two oscillators with an oscillation frequency of 50 kHz are built in with a phase shift of 180 degrees, and about 2 mL of CONTAMINON N is added to the water tank.

(4) The beaker of (2) hereinabove is set in the beaker fixing hole of the ultrasonic disperser, and the ultrasonic disperser is actuated. Then, the height position of the beaker is adjusted so that the resonance state of the liquid surface of the electrolytic aqueous solution in the beaker is maximized.

(5) About 10 mg of the toner is added little by little to the electrolytic aqueous solution and dispersed therein in a state in which the electrolytic aqueous solution in the beaker of (4) hereinabove is irradiated with ultrasonic waves. Then, the ultrasonic dispersion process is further continued for 60 sec. In the ultrasonic dispersion, the water temperature in the water tank is appropriately adjusted to a temperature from 10° C. to 40° C.

(6) The electrolytic aqueous solution of (5) hereinabove in which the toner is dispersed is dropped by using a pipette into the round bottom beaker of (1) hereinabove which has been set in the sample stand, and the measurement concentration is adjusted to be about 5%. Then, measurement is conducted until the number of particles to be measured reaches 50,000.

(7) The measurement data are analyzed with the dedicated software provided with the device, and D10, D50, and D90 are calculated.

Preferably, Expression (3) below is satisfied, where as denotes the absolute value of the average value of surface charge density of the second group in the toner, and al denotes the absolute value of the average value of the surface charge density of the first group.

$$0.10 \leq \sigma l/\sigma s \leq 0.75 \quad (3)$$

The surface charge density a of the toner can be measured in accordance with the following method. As described above, the toner is divided substantially evenly in two, on a number basis, into a first group being the large particle size side and a second group being the small particle size side, to thereby yield the first group and the second group. Then a respective surface charge density a is measured using the toner thus divided in two.

Firstly, in an environment at 23° C. and 50% RH, 0.7 g of the toner and 9.3 g of a standard carrier (N-01) of the Imaging Society of Japan are placed in a 50 ml resin bottle that is then shaken for 5 minutes at 200 rpm, using a YAYOI shaker, to triboelectrically charge the toner thereby. A charge quantity per toner particle, for each particle size, is then measured using a charge quantity distribution measuring device.

Herein an E-SPART Analyzer (by Hosokawa Micron Corporation) can be used for the measurement. The E-SPART Analyzer is a device in which sample particles are introduced into a detection unit (measuring unit) having simultaneously formed therein an electric field and an acoustic field, and in which the moving speed of particles is measured in accordance with a laser Doppler method, to thereby measure particle size and charge quantity.

The surface charge density a is then calculated from the charge quantity per toner particle, for each particle size, as obtained in the measurement. Specifically, the surface charge density a can be derived using the calculation expression below.

$$\sigma = Q/\pi D^2$$

In the expression, Q is the amount of charge and D is a number-average particle diameter of the toner.

Fogging and drops in transferability caused by small particle size toner which is the second group can be suppressed, excessive increases in the toner charge quantity per unit mass caused by large particle size toner which is the first group can be curtailed, and image density stability can be improved, by virtue of the fact that the toner satisfies Expression (3).

A precision particle size distribution measuring device "Coulter Counter Multisizer 3" (registered trademark product name, by Beckman Coulter, Inc.) equipped with a 100 μm aperture tube can be used for measuring the number-average particle diameter of the toner. Ancillary dedicated software "Beckman Coulter Multisizer 3 Version 3.51" (by Beckman Coulter, Inc.) can be used for setting measurement conditions and analyzing measurement data.

Preferably, Expression (4) below is satisfied, where as denotes the absolute value of the average value of surface charge density of the second group.

$$0.04 \leq \sigma s \quad (4)$$

The amount of charge of the small particle size toner is large by virtue of the fact that the toner satisfies Expression (4); it becomes accordingly possible to reduce the amount of toner having a small electric field flight force, so that transferability is improved and fogging suppressed.

Preferably, Expression (5) below is satisfied, where al denotes the absolute value of the average value of surface charge density of the first group.

$$\sigma l \leq 0.03 \quad (5)$$

By virtue of the fact that the toner satisfies Expression (5), the amount of charge of the toner of the first group does not become excessively large; as a result, the charge quantity per unit mass is not excessive, and thus image density stability can be accordingly improved.

An absolute value Qs of the average value of the amount of charge per toner particle of the second group is preferably 1.4 fC or larger. As a result, the quantity of particles having a small amount of charge can be reduced, transferability can be improved, and fogging can be suppressed.

An absolute value Ql of the average value of the amount of charge per toner particle of the first group is preferably 2.8 fC or smaller. As a result, the charge quantity per unit mass of toner can be prevented from becoming excessively large, and image density stability is improved.

Preferably, the charge quantity per unit mass of the toner is 70 μC/g or less. Drops in image density can be suppressed as a result. The charge quantity per unit mass of the toner can be measured for instance in accordance with the method described below.

Firstly, in an environment at 23° C. and 50% RH, 0.7 g of the toner and 9.3 g of a standard carrier (N-01) of the Imaging Society of Japan are placed in a 50 ml resin bottle that is then shaken for 5 minutes at 200 rpm, using a YAYOI shaker, to triboelectrically charge the toner thereby. Next, 0.15 g of the triboelectrically charged toner is placed in a metal-made measuring container having a 635 mesh screen at the bottom, and the container is closed with a metal lid. The mass of the entire measuring container is weighed, as W1 (g).

The measuring container is evacuated next, through a suction port, in a suction device (such that at least a portion of the suction device in contact with the measuring container is an insulator), with a vacuum-gauge pressure being set to 1.5 kPa through adjustment of an air quantity control valve. In this state, the toner is removed by being thoroughly suctioned, preferably suctioned for 2 minutes. The amount of charge accumulated in a capacitor at this time is Q (C). The mass of the entire measuring container after suction is weighed, as W2 (g). The charge quantity per unit mass of toner (μC/g) is obtained on the basis of the expression below.

Charge quantity per unit mass of toner (μC/g)=$Q/(W1-W2)$

The method for bonding (preferably by graft copolymerization) the polyolefin and the vinyl polymer is not particularly limited, and a conventionally known method can be resorted to.

The monomer units containing sulfonic acid groups can be formed using a monomer that has a sulfonic acid group. The monomer having a sulfonic acid group has preferably ethylenically unsaturated bonds, and more preferably has one ethylenically unsaturated bond.

A (meth)acrylamide sulfonic acid derivative is preferable as a vinyl monomer having a sulfonic acid group.

Examples include for instance 2-acrylamidepropanesulfonic acid, 2-acrylamide-n-butanesulfonic acid, 2-acrylamide-n-hexanesulfonic acid, 2-acrylamide-n-octanesulfonic acid, 2-acrylamide-n-dodecanesulfonic acid, 2-acrylamide-n-tetradecanesulfonic acid, 2-acrylamide-2-methylpropanesulfonic acid, 2-acrylamide-2-phenylpropanesulfonic acid, 2-acrylamide-2,2,4-trimethylpentanesulfonic acid, 2-acrylamide-2-methylphenylethanesulfonic acid, 2-acrylamide-2-(4-chlorophenyl)propanesulfonic acid, 2-acrylamide-2-carboxymethylpropanesulfonic acid, 2-acrylamide-2-(2-pyridyl)propanesulfonic acid, 2-acrylamide-1-methylpropanesulfonic acid, 3-acrylamide-3-methylbutanesulfonic acid, 2-methacryamide-n-decanesulfonic acid and 2-methacryamide-n-tetradecanesulfonic acid. Preferred herein is 2-acrylamide-2-methylpropanesulfonic acid.

The monomer units having a sulfonic acid group are preferably represented by Formula (C) below.

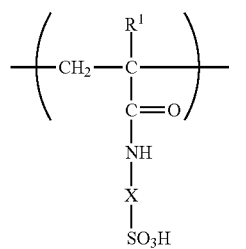

(C)

In Formula (C), $R^1$ represents a hydrogen atom or a methyl group (preferably a hydrogen atom). Further, X represents a linear or branched alkylene group having 1 to 8 (preferably 2 to 6, and more preferably 4 to 6, and yet more preferably 4) carbon atoms.

The polyolefin resin having sulfonic acid groups is a polymer in which a vinyl polymer is bonded to a polyolefin. Preferably the vinyl polymer has a structure derived from a cycloalkyl (meth)acrylate. The term structure derived from a cycloalkyl (meth)acrylate denotes a structure resulting from polymerization of an acryloyl group or methacryloyl group included in a cycloalkyl (meth)acrylate, in the vinyl polymer. Preferably, the vinyl polymer is a polymer of a cycloalkyl (meth)acrylate, a vinylic monomer other than a cycloalkyl (meth)acrylate, and a monomer having a sulfonic acid group.

Preferably a C3 to C18 saturated alicyclic hydrocarbon group, and more preferably a C4 to C12 saturated alicyclic hydrocarbon group, serves herein as the cycloalkyl group of the cycloalkyl (meth)acrylate. The saturated alicyclic hydrocarbon group encompasses for instance monocyclic saturated alicyclic hydrocarbon groups, condensed polycyclic hydrocarbon groups, bridged ring hydrocarbon groups and spiro hydrocarbon groups, Examples of saturated alicyclic hydrocarbon groups include a cyclopropyl group, a cyclobutyl group, a cyclopentyl group, a cyclohexyl group, a t-butylcyclohexyl group, a cycloheptyl group, a cyclooctyl group, a tricyclodecanyl group, a decahydro-2-naphthyl group, a tricyclo[5.2.1.0$^{2,6}$] decan-8-yl group, a pentacyclopentadecanyl group, an isobornyl group, an adamantyl group, a dicyclopentanyl group and a tricyclopentanyl group.

The saturated alicyclic hydrocarbon group can have an alkyl group, a halogen atom, a carboxy group, a carbonyl group, a hydroxyl group or the like as a substituent. Preferred as a substituent in the form of an alkyl group is herein a C1 to C4 alkyl group.

More preferable among these saturated alicyclic hydrocarbon groups are C3 to C18 monocyclic saturated alicyclic hydrocarbon groups, substituted or unsubstituted dicyclopentanyl groups, and substituted or unsubstituted tricyclopentanyl groups, while C6 to C10 cycloalkyl groups are yet more preferable, with a cyclohexyl group being particularly preferable herein.

The content of the monomer unit derived from the cycloalkyl (meth)acrylate in the vinyl polymer is preferably from 1.0 mass % to 10.0 mass %.

Preferably, the weight-average molecular weight (Mw) of the polyolefin resin having a sulfonic acid group, in a molecular weight distribution by GPC, is from 5000 to 70000.

Another vinylic monomer other than a cycloalkyl (meth) acrylate can be used in the vinyl polymer. A monomer having one ethylenically unsaturated bond is preferred herein.

Examples thereof include acrylic acid and methacrylic acid; styrenic monomers such as styrene, α-methyl styrene, p-methyl styrene, m-methyl styrene, p-methoxy styrene, p-hydroxy styrene, p-acetoxy styrene, vinyltoluene, ethyl styrene, phenyl styrene and benzyl styrene; alkyl esters of unsaturated carboxylic acids (where the number of carbon atoms in the alkyl is from 1 to 18) such as methyl acrylate, ethyl acrylate, butyl acrylate, 2-ethylhexyl acrylate, methyl methacrylate, ethyl methacrylate, butyl methacrylate and 2-ethylhexyl methacrylate; vinyl ester type monomers such as vinyl acetate; vinyl ether type monomers such as vinyl methyl ether; halogen element-containing vinylic monomers such as vinyl chloride; and diene type monomers such as butadiene and isobutylene. These may be used as a plurality thereof.

Preferred herein are styrenic monomers and alkyl esters of unsaturated carboxylic acids.

The content ratio of the vinyl polymer in the polyolefin resin having sulfonic acid groups is preferably from 80.0 mass % to 95.0 mass %, more preferably from 85.0 mass % to 95.0 mass %.

Suitable examples of the polyolefin include low molecular weight polyethylene, low molecular weight polypropylene, alkylene copolymers, and hydrocarbon waxes such as microcrystalline wax and paraffin wax.

Preferably, the polyolefin has a branched structure, as in polypropylene, from the viewpoint of reactivity during production of the polyolefin resin having sulfonic acid groups.

The content ratio of the polyolefin in the polyolefin resin having sulfonic acid groups is preferably from 5.0 mass % to 20.0 mass %.

The content of the polyolefin resin having sulfonic acid groups is preferably 3 parts by mass to 15 parts by mass, and more preferably 5 parts by mass to 15 parts by mass, relative to 100 parts by mass of the binder resin.

A method for further localizing the polyolefin resin having sulfonic acid groups in the vicinity of the toner particle surface of the second group (small particle size toner) is not particularly limited.

In some methods, for instance a release agent is incorporated into the toner particle, which is then subjected to a thermal treatment. The polyolefin resin having sulfonic acid groups is a polymer in which a vinyl polymer is bonded to a polyolefin. Therefore, when the surface of the toner particle is treated by a hot air current using a surface treatment apparatus such as that illustrated in the FIGURE, a release agent constitutes a driving force by which the polyolefin resin becomes oriented on the surface of the toner particle.

The surface area of the small particle size toner is large at that time, and as a result that toner is affected more readily by a hot air current, and localization of the polyolefin resin on the toner surface is promoted as a result.

For instance, the surface treatment by a hot air current can be carried out using the surface treatment apparatus illustrated in the FIGURE. The toner particle is treated with a hot air current in a hydrophobic field in the air, using the surface treatment apparatus illustrated in the FIGURE, and as a result the release agent contained in the toner particle moves as needed towards the vicinity of the surface of the toner particle. In consequence the hydrophobicity of the toner surface increases, a moisture adsorption amount in a high-temperature, high-humidity environment decreases, and non-electrostatic attachment forces can be kept low, so that as a result excellent developing performance is obtained, and fogging is readily suppressed.

Binder Resin

From the viewpoint of low-temperature fixability, the toner particle contains a binder resin that includes a polyester resin. The binder resin may contain a resin other than the polyester resin, so long as the effect of the present disclosure is not impaired thereby. The polyester resin is preferably an amorphous polyester resin.

The following amorphous resins can be used as the resin other than a polyester resin in the binder resin.

Monopolymers of styrene such as polystyrene, poly-p-chlorostyrene, polyvinyltoluene and substituted products thereof, styrenic copolymers such as styrene-p-chlorostyrene copolymers, styrene-vinyltoluene copolymers, styrene-vinylnaphthalene copolymers, styrene-acrylate ester copolymers and styrene-methacrylate ester copolymers; as well as polyvinyl chloride, phenolic resins, natural resin-modified phenolic resins, natural resin-modified maleic acid resins, acrylic resins, methacrylic resins, polyvinyl acetate, silicone resins, polyurethane resins, polyamide resins, furan resins, epoxy resins, xylene resins, polyethylene resins and polypropylene resins.

A polyhydric alcohol (dihydric, trihydric or higher alcohol), and a polyvalent carboxylic acid (divalent, trivalent or higher carboxylic acid) as well as acid anhydrides and lower alkyl esters thereof, are used as the monomers that are utilized in the polyester resin.

In order to bring about "strain curability" it is effective herein to elicit partial crosslinking of the interior of the molecule of the amorphous resin, for the purpose of producing a branched polymer. To that end it is preferable to use trivalent or higher polyfunctional compounds. Accordingly, the starting monomers of the polyester resin include preferably a trivalent or higher carboxylic acid, or an anhydride or lower alkyl ester thereof, and/or a trihydric or higher alcohol.

Examples of polyhydric alcohol monomers that can be used utilized in the polyester resin include the following polyhydric alcohol monomers.

Examples of the dihydric alcohol component include ethylene glycol, propylene glycol, 1,3-butanediol, 1,4-butanediol, 2,3-butanediol, diethylene glycol, triethylene glycol, 1,5-pentanediol, 6-hexanediol, neopentyl glycol, 2-ethyl-1,3-hexanediol, hydrogenated bisphenol A, bisphenol represented by formula (A) and derivatives thereof, and diols represented by formula (B).

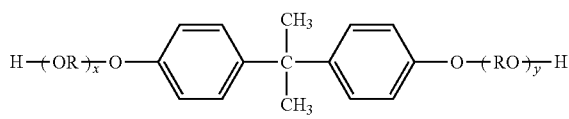

(A)

(in the formula (A), R is ethylene or propylene, x and y are each an integer of 0 or more, and the average value of x+y is from 0 to 10).

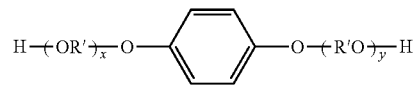

(B)

(in the formula (B), R' is —CH$_2$CH$_2$—, —CH$_2$CH(CH$_3$)—, or —CH$_2$C(CH$_3$)$_2$—; x and y are each an integer of 0 or more; and the average value of x+y is 0 to 10).

Examples of the trivalent or higher alcohol component include sorbitol, 1,2,3,6-hexanetetrol, 1,4-sorbitan, pentaerythritol, dipentaerythritol, tripentaerythritol, and 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene. Among these, glycerol, trimethylolpropane and pentaerythritol are preferably used. These dihydric alcohols and trihydric or higher alcohols may be used singly or in combination of a plurality thereof.

The following polyvalent carboxylic acid monomers can be used as a polyvalent carboxylic acid monomer used for the polyester resin.

Examples of the divalent carboxylic acid component include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid, isooctylsuccinic acid, anhydrides of these acids, lower alkyl esters thereof and the like. Among these, maleic acid, fumaric acid, terephthalic acid and n-dodecenyl succinic acid are preferably used.

Examples of the trivalent or higher carboxylic acid, acid anhydrides thereof and lower alkyl esters thereof include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)

methane, 1,2,7,8-octanetetracarboxylic acid, pyromellitic acid, Empol trimer acid, acid anhydrides thereof and lower alkyl esters thereof.

Among these, 1,2,4-benzenetricarboxylic acid, that is, trimellitic acid or a derivative thereof is particularly preferably used because it is inexpensive and the reaction control is easy. These divalent carboxylic acids and the like and trivalent or higher carboxylic acids can be used alone or in combination of a plurality thereof.

A method for producing the polyester resin is not particularly limited, and known methods can be used. For example, the above-mentioned alcohol monomer and carboxylic acid monomer are simultaneously charged and polymerized through an esterification reaction or a transesterification reaction and a condensation reaction to produce a polyester resin.

The polymerization temperature is not particularly limited, but is preferably in the range of from 180° C. to 290° C. In the polymerization of the polyester resin, for example, a polymerization catalyst such as a titanium-based catalyst, a tin-based catalyst, zinc acetate, antimony trioxide, germanium dioxide or the like can be used. In particular, when the polyester resin is an amorphous resin, the amorphous resin is more preferably a polyester resin polymerized using a tin-based catalyst.

The acid value of the polyester resin is preferably from 5 mg KOH/g to 20 mg KOH/g, and the hydroxyl value is preferably from 20 mg KOH/g to 70 mg KOH/g. Within the above ranges, the amount of adsorbed moisture under a high-temperature and high-humidity environment can be suppressed and the non-electrostatic attachment force can be suppressed to a low level, which is preferable from the viewpoint of suppressing fogging.

The polyester resin may be used by mixing a low molecular weight resin and a high molecular weight resin. From the viewpoint of low-temperature fixability and hot offset resistance, the content ratio of the low molecular weight resin with respect to the high molecular weight resin is preferably from 40/60 to 85/15 on a mass basis.

Crystalline Resin

The toner particle may contain a crystalline resin. A condensation polymer of a known polyvalent carboxylic acid and a known polyol can be used as the crystalline resin. Preferably, the crystalline resin is a crystalline polyester resin.

The crystalline polyester resin has a high concentration of ester groups in the molecule. It is considered that the crystalline polyester resin has a property of easily adsorbing water molecules, since the ester groups thereof and water molecules in the atmosphere readily generate hydrogen bonds. Therefore, the amount of moisture adsorbed on the toner can be controlled on the basis of the content of the crystalline polyester resin in the toner.

The crystalline resin is preferably a condensation polymer of a from C4 to C18 aliphatic diol and a from C4 to C18 aliphatic dicarboxylic acid.

Within the above range, the concentration of ester groups in the molecule becomes satisfactory, hydrogen bonds with water molecules in the atmosphere are not formed in an excessive degree, and the amount of moisture adsorbed by the toner is stabilized. Further, the compatibility between the binder resin and the crystalline resin is enhanced, and the crystalline resin is readily dispersed in the toner uniformly. Therefore, it is considered that the ester groups derived from the crystalline polyester resin can be stably present near the surface of the toner particle, as a result of which the amount of moisture adsorbed by the toner can be easily controlled.

The content of the crystalline resin is preferably from 1.0 parts by mass to 15.0 parts by mass, and more preferably from 3.0 parts by mass to 10.0 parts by mass, relative to 100.0 parts by mass of the binder resin.

When the content of the crystalline resin lies within the above range, the ester groups derived from the crystalline resin on the surface of the toner particle are not excessively abundant, and the amount of moisture adsorbed on the toner is stabilized.

Release Agent (Wax)

A wax can be used as a release agent in the toner particle. Examples include the following.

Hydrocarbon waxes such as low molecular weight polyethylene, low molecular weight polypropylene, alkylene copolymers, microcrystalline wax, paraffin wax, and Fischer-Tropsch wax; oxides of hydrocarbon waxes such as oxidized polyethylene wax or block copolymers thereof, waxes based on fatty acid esters such as carnauba wax; partially or entirely deoxidized fatty acid esters such as deoxidized carnauba wax. Further, the following may be mentioned.

Saturated linear fatty acids such as palmitic acid, stearic acid and montanic acid; unsaturated fatty acids such as brassidic acid, eleostearic acid and parinaric acid; saturated alcohols such as stearyl alcohol, aralkyl alcohol, behenyl alcohol, carnaubyl alcohol, ceryl alcohol, and melissyl alcohol; polyhydric alcohols such as sorbitol; esters of fatty acids such as palmitic acid, stearic acid, behenic acid, and montanic acid with alcohols such as stearyl alcohol, aralkyl alcohol, behenyl alcohol, carnaubyl alcohol, ceryl alcohol, and melissyl alcohol; fatty acid amides such as linoleic acid amide, oleic acid amide, and lauric acid amide; saturated fatty acid bisamides such as methylene bis(stearic acid amide), ethylene bis(capric acid amide), ethylene bis(lauric acid amide), and hexamethylene bis(stearic acid amide); unsaturated fatty acid amides such as ethylene bis(oleic acid amide), hexamethylene bis(oleic acid amide), N,N'-dioleyl adipic acid amide, and N,N'-dioleyl sebacic acid amide; aromatic bisamides such as m-xylene bis(stearic acid amide) and N,N'-distearyl isophthalic acid amide; metal salt of fatty acid such as calcium stearate, calcium laurate, zinc stearate, and magnesium stearate (generally referred to as metal soaps); waxes obtained by grafting aliphatic hydrocarbon waxes by using vinyl monomers such as styrene and acrylic acid; partial esterification products of fatty acids with polyhydric alcohols such as monoglyceride behenate; and methyl ester compounds having a hydroxyl group which are obtained by hydrogenation of vegetable fats and oils.

Among these waxes, from the viewpoint of improving low-temperature fixability and fixation separability, hydrocarbon waxes such as paraffin wax and Fischer-Tropsch wax, and fatty acid ester waxes such as carnauba wax are preferable. Hydrocarbon waxes are more preferable in that the hot offset resistance is further improved. The content of the wax is preferably 3 parts by mass to 15 parts by mass with respect to 100 parts by mass of the binder resin.

Further, in the endothermic curve at the time of temperature rise measured with a differential scanning calorimetry (DSC) device, the peak temperature of the maximum endothermic peak of the wax is preferably from 45° C. to 140° C. This range of the peak temperature of the maximum endothermic peak of the wax is preferable because both the storage stability of the toner and the hot offset resistance can be achieved.

Colorant

The toner particle of the present invention may contain a colorant. Examples of the colorant are listed below.

Examples of black colorants include carbon black, and colorants that are color-matched to black using a yellow colorant, a magenta colorant or a cyan colorant. The colorant may utilize just pigments alone, but in terms of the image quality in a full-color image, more preferably sharpness is increased through the concomitant use of dyes and pigments.

Examples of magenta toner pigments include the following. C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48: 2, 48: 3, 48: 4, 49, 50, 51, 52, 53, 54, 55, 57: 1, 58, 60, 63, 64, 68, 81: 1, 83, 87, 88, 89, 90, 112, 114, 122, 123, 146, 147, 150, 163, 184, 202, 206, 207, 209, 238, 269 and 282; C.I. Pigment Violet 19; and C.I. Vat Red 1, 2, 10, 13, 15, 23, 29 and 35.

Examples of magenta toner dyes include the following. C.I. Solvent Red 1, 3, 8, 23, 24, 25, 27, 30, 49, 81, 82, 83, 84, 100, 109 and 121; C.I. Disperse Red 9; C.I. Solvent Violet 8, 13, 14, 21 and 27; oil-soluble dyes such as C.I. Disper Violet 1, C.I. Basic Red 1, 2, 9, 12, 13, 14, 15, 17, 18, 22, 23, 24, 27, 29, 32, 34, 35, 36, 37, 38, 39 and 40; and basic dyes such as C.I. Basic Violet 1, 3, 7, 10, 14, 15, 21, 25, 26, 27 and 28.

Examples of cyan toner pigments include the following. C.I. Pigment Blue 2, 3, 15: 2, 15: 3, 15: 4, 16 and 17; C.I. Vat Blue 6; C.I. Acid Blue 45; and copper phthalocyanine pigments in which the phthalocyanine skeleton is substituted with 1 to 5 phthalimidemethyl groups.

Examples of cyan toner dyes include C.I. Solvent Blue 70.

Examples of yellow toner pigments include the following. C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181 and 185; and C.I. Vat Yellow 1, 3 and 20.

Examples of yellow toner dyes include C.I. Solvent Yellow 162.

These colorants can be used singly or in mixtures thereof, and also in a solid solution state. The colorant is selected from the viewpoint of hue angle, chroma, lightness, light fastness, OHP transparency, and dispersibility in the toner.

The content of the colorant is preferably from 0.1 parts by mass to 30.0 parts by mass with respect to 100 parts by mass of the binder resin.

Inorganic Fine Particles

The toner may contain inorganic fine particles, as needed.

The inorganic fine particles may be internally added to the toner particle, or may be mixed with the toner particle, as an external additive.

Preferred as the external additive are herein inorganic fine particles such as silica fine particles, aluminum oxide fine particles, titanium oxide fine particles and strontium titanate fine particles. From the viewpoint of fogging suppression and transfer efficiency, in particular, an external additive of low resistance, such as titanium oxide fine particles or strontium titanate fine particles is preferred, since in that case changes in charge quantity derived from the temperature and humidity environment can be curtailed, so that localization of toner charge is suppressed and electrostatic attachment forces become weaker. The inorganic fine particles are preferably hydrophobized using a hydrophobizing agent such as a silane compound, silicone oil, or a mixture thereof.

Inorganic fine particles having a specific surface area from 50 $m^2$/g to 400 $m^2$/g are preferred as an external additive for increasing flowability.

The toner particle and the external additive can be mixed using a known mixer such as a Henschel mixer. The content of the external additive is preferably from 0.1 parts by mass to 10.0 parts by mass relative to 100 parts by mass of the toner particle.

Developer

The toner can be used as a one-component developer, but can be used also as a two-component developer, by being mixed with a magnetic carrier, for the purpose of further improving dot reproducibility, and for the purpose of supplying a stable image over long periods of time.

Magnetic carriers include generally known materials such as, for example, iron oxide; metal particles such as iron, lithium, calcium, magnesium, nickel, copper, zinc, cobalt, manganese, chromium and rare earths, alloy particles thereof, and oxide particles thereof; magnetic bodies such as ferrites; magnetic body-dispersed resin carriers (the so-called resin carriers) including a binder resin in which the magnetic bodies are held in a dispersed state; and the like.

When the toner is mixed with a magnetic carrier and used as a two-component developer, the mixing ratio of the magnetic carrier at that time is preferably from 2% by mass to 15% by mass, and more preferably 4% by mass to 13% by mass as the toner concentration in the two-component developer.

Toner Production Method

The method for producing the toner particle is not particularly limited, but is preferably a pulverization method, from the viewpoint of dispersion of for instance the polyolefin resin having sulfonic acid groups. In this case a highly hydrophobic release agent and the polyolefin resin can be readily localized on the vicinity of the surface of the toner particle. Localization of the polyolefin resin in the vicinity of the toner particle surface, by a thermal treatment device, is readily accomplished as a result.

A toner production procedure in a pulverization method will be explained next.

Preferably, the toner production method includes a step of obtaining a kneaded product by melt-kneading a resin composition containing a binder resin that includes a polyester resin and a polyolefin resin having sulfonic acid groups;

a step of obtaining a cooled product by cooling the kneaded product;

a step of obtaining a toner particle by pulverizing the cooled product; and a step of subjecting the toner particle to a thermal treatment by a hot air current.

In a starting material mixing step, for instance a binder resin including a polyester resin, a polyolefin resin having a sulfonic acid group, as the materials that make up the toner particle, and as needed other components such as a release agent, a colorant, a charge control agent and so forth, are weighed in predetermined amounts, and are blended and mixed, to yield a resin composition.

Examples of the mixing apparatus include a double-cone mixer, a V-type mixer, a drum mixer, a super mixer, a Henschel mixer, a NAUTA mixer, and a MECHANO HYBRID (manufactured by Nippon Coke Industry Co., Ltd.).

Next, the mixed resin composition is melt-kneaded to obtain the kneaded product where the materials are dispersed in the binder resin. In the melt-kneading process, a batch-type kneader such as a pressure kneader or a Banbury mixer, or a continuous-type kneader can be used, and a single- or twin-screw extruder is preferably used because of its superiority of continuous production.

Specific examples of the single- or twin-screw extruder include a KTK type twin-screw extruder (manufactured by Kobe Steel, Ltd.), a TEM type twin-screw extruder (manufactured by Toshiba Machine Co., Ltd.), a PCM kneader (made by Ikegai Corp.), a twin-screw extruder (manufactured by KCK Co.), Co-Kneader (manufactured by Buss AG) and KNEADEX (manufactured by Nippon Coke & Engineering Co., Ltd.).

Furthermore, the resin composition obtained by melt-kneading may be rolled with a two-roll mill or the like, and may be cooled with water or the like in the cooling step.

The cooled product obtained by cooling is then pulverized to the desired particle size in the pulverization step. In the pulverization step, coarse pulverization is performed with a pulverizing device such as, for example, a crusher, a hammer mill, or a feather mill. Thereafter, for example, the material is finely pulverized by a KRYPTON system (manufactured by Kawasaki Heavy Industries, Ltd.), SUPER ROTOR (manufactured by Nisshin Engineering Co., Ltd.), TURBO MILL (manufactured by Turbo Kogyo) or an air jet type fine pulverizing device to obtain the toner particle.

The toner particle is next classified as needed using a classifier or a sieving machine. Examples of classifiers and sieving machines include for instance the following. An Elbow-jet inertial classification system (by Nittetsu Mining Co., Ltd.), a centrifugal classification system Turboplex (by Hosokawa Micron Corporation), a TSP separator (by Hosokawa Micron Corporation), and FACULTY (by Hosokawa Micron Corporation).

Thereafter, the toner particle may be surface-treated by heating, to increase the circularity of the toner. For instance, a surface treatment by a hot air current can be carried out using the surface treatment apparatus illustrated in the FIGURE.

A surface treatment using the surface treatment apparatus illustrated in the FIGURE will be explained next.

The mixture having been dispensed by a starting material metering means 1 is guided to an introduction tube 3 installed on a vertical line of the starting material supply means, by a compressed gas adjusted by a compressed gas adjustment means 2. The mixture having passed through the introduction tube is uniformly dispersed by a conical protruding member 4 provided at the central portion of the starting material supply means, is guided to a 8-way supply pipe 5 radiating in respective directions, and is guided to a treatment chamber 6 in which the thermal treatment is carried out.

At this time, the flow of the mixture supplied to the treatment chamber 6 is regulated by a regulation means 9 provided in the treatment chamber 6 for regulating the flow of the mixture. For this reason, the mixture supplied to the treatment chamber 6 is cooled after being heat-treated while swirling in the treatment chamber 6.

Hot air for heat-treating the supplied mixture is supplied from the hot air supply means 7 via the inlet 11 of the treatment chamber 6, and is swirled and introduced into the treatment chamber 6 by a swirling member 13 for swirling the hot air. As a specific configuration, the swirling member 13 for swirling the hot air may have a plurality of blades, and the swirling of the hot air can be controlled by the number and angle of the blades.

The temperature of the hot air supplied into the treatment chamber 6 at the outlet of the hot air supply means 7 is preferably from 100° C. to 300° C. Where the temperature at the outlet of the hot air supply means 7 is within the above range, the toner particles can be uniformly spheroidized while preventing fusion or coalescence of the toner particles due to excessive heating of the mixture.

Further, the heat-treated toner particles subjected to the heat treatment are cooled by the cold air supplied from a cold air supply means 8 (8-1, 8-2, 8-3), and the temperature supplied from the cold air supply means 8 is preferably −20° C. to 30° C. Where the temperature of the cold air is within the above range, the heat-treated toner particles can be efficiently cooled, and fusion or coalescence of the heat-treated toner particles can be prevented without inhibiting uniform spheroidization of the mixture. The absolute moisture content of the cold air is preferably from 0.5 g/m$^3$ to 15.0 g/m$^3$.

Next, the cooled heat-treated toner particles are collected by a collection means 10 at the lower end of the treatment chamber 6. A blower (not shown) is provided at the end of the collection means 10 and configured to ensure suction and transportation of the toner particles.

Further, a powder particle supply port 14 is provided such that the swirling direction of the supplied mixture and the swirling direction of the hot air are the same, and the collection means 10 of the surface treatment apparatus is provided on the outer periphery of the treatment chamber 6 so as to maintain the swirling direction of the swirled powder particles. Furthermore, the cold air supplied from the cold air supply means 8 is supplied horizontally and tangentially from the outer peripheral portion of the apparatus to the peripheral surface of the treatment chamber.

The swirling direction of the toner particles supplied from the powder supply port, the swirling direction of the cold air supplied from the cold air supply means 8, and the swirling direction of the hot air supplied from the hot air supply means 7 are all the same. Therefore, no turbulent flow occurs in the treatment chamber 6, the swirling flow in the apparatus is enhanced, strong centrifugal force is applied to the toner particles, and the dispersibility of the toner particles is further improved. As a result, toner particles including few coalesced particles and having uniform shape can be obtained.

In terms of suppressing fogging, a range from 0.960 to 0.980 as the average circularity of the toner particle is preferable, since within that range non-electrostatic attachment forces can be kept low.

Thereafter, the toner can be divided in two as needed, into a fine powder toner and a coarse powder toner. For instance, the toner can be divided in two using an Elbow-jet inertial classification system (by Nittetsu Mining Co., Ltd.). An arbitrary fine powder toner and an arbitrary coarse powder toner may be mixed in order to achieve desired physical properties. The obtained toner particle may be used, as-is, as the toner; alternatively, the toner particle may be used as the toner after inorganic fine particles such as silica fine particles have been externally added to the toner particle.

Methods that involve performing an external addition treatment include for instance a method of stirring/mixing using a mixing device as an external addition machine. Examples of mixing devices include the following. A double-cone mixer, a V-shaped mixer, a drum mixer, a Super mixer, a Henschel mixer, a Nauta mixer, a Mechano Hybrid (by Nippon Coke & Engineering Co., Ltd.) and Nobilta (by Hosokawa Micron Corporation). An external addition treatment with an external additive other than silica fine particles, for instance a fluidizing agent, may be carried out at this time as needed.

Measurement methods of the various physical properties of the toner and the starting materials will be explained next.
FT-IR Spectrum Measurement of Toner (Calculation of As, Al, Bs and Bl)

As samples there are used a first group and a second group obtained, as described above, by dividing the toner into two substantially equal parts, on a number basis, namely into a first group being a large particle size side and into a second group being a small particle size side, using an Elbow-jet classifier (by Nittetsu Mining Co., Ltd.) of an inertial classification system, as described above.

Herein the FT-IR spectrum of the toner is measured in accordance with an ATR method, using a Fourier-transform infrared spectroscopic analyzer (product name: Spectrum One, by PerkinElmer, Inc.) equipped with a universal ATR measurement accessory (UniversalATR Sampling Accessory). The specific measurement procedure and the method for calculating As, Al, Bs and Bl are as follows.

The incidence angle of infrared light ($\lambda$=5 µm) is set to 45°. Further, an ATR crystal (refractive index=4.0) of Ge or an ATR crystal (refractive index=2.4) of diamond is used as the ATR crystal. Other conditions are as follows.

Range
Start: 4000 $cm^{-1}$
End: 600 $cm^{-1}$ (Ge ATR crystal)
400 $cm^{-1}$ (diamond ATR crystal)
Duration
Scan number: 16
Resolution: 4.00 $cm^{-1}$
Advanced: $CO_2/H_2O$ corrected (1) The Ge ATR crystal (refractive index=4.0) is set in the device.
(2) Scan type is set to Background, Units is set to EGY, and the background is measured.
(3) Scan type is set to Sample and Units is set to A.
(4) Then 0.01 g of toner are weighed exactly on the ATR crystal.
(5) The sample is pressed using a pressure arm (Force Gauge of 100).
(6) The sample is measured.
(7) The obtained FT-IR spectrum is subjected to base line correction with Automatic Correction.
(8) A respective maximum absorption peak intensity in the range from 1130 $cm^{-1}$ to 1170 $cm^{-1}$ is calculated, and is divided by a respective maximum absorption peak intensity in the range from 1713 $cm^{-1}$ to 1723 $cm^{-1}$, to calculate As and Al.
(9) The measurement is carried out in accordance with the same method also for a diamond crystal, to calculate Bs and Bl.

Measurement of the Peak Molecular Weight and Weight-Average Molecular Weight of the Binder Resin and the Polyolefin Resin Having Sulfonic Acid Groups, by GPC The molecular weight distribution of the THF soluble matter of the resin is measured by gel permeation chromatography (GPC) in the following manner.

First, the sample is dissolved in tetrahydrofuran (THF) for 24 h at room temperature. Then, the resulting solution is filtered through a solvent-resistant membrane filter "MAE-SHORI DISK" (manufactured by Tosoh Corporation) having a pore diameter of 0.2 m to obtain a sample solution. The sample solution is adjusted so that the concentration of the components soluble in THE is about 0.8% by mass.

The measurement is performed under the following conditions by using this sample solution.
Device: HLC8120 GPC (detector: RI) (manufactured by Tosoh Corporation)
Column: 7 series of Shodex KF-801, 802, 803, 804, 805, 806, 807 (manufactured by Showa Denko K.K.)
Eluent: tetrahydrofuran (THF)
Flow rate: 1.0 ml/min
Oven temperature: 40.0° C.
Sample injection volume: 0.10 ml When calculating the molecular weight of the sample, a molecular weight calibration curve prepared using a standard polystyrene resin (for example, trade name "TSK standard polystyrene F-850, F-450, F-288, F-128, F-80, F-40, F-20, F-10, F-4, F-2, F-1, A-5000, A-2500, A-1000, A-500", manufactured by Tosoh Corporation) is used.

Method for Measuring the Softening Point of the Binder Resin and the Polyolefin Resin Having Sulfonic Acid Groups The measurement of the softening point is carried out using a constant-load extrusion type capillary rheometer "Flow Characteristic Evaluation Apparatus Flow Tester CFT-500D" (manufactured by Shimadzu Corporation) according to the manual provided with the apparatus. In this apparatus, the temperature of the measurement sample filled in the cylinder is raised and the sample is melted while applying a constant load with a piston from the top of the measurement sample, the melted measurement sample is extruded from a die at the bottom of the cylinder, and a flow curve showing the relationship between the piston descent amount and temperature at this time can be obtained.

The "melting temperature in the 1/2 method" described in the manual provided with the "Flow Characteristic Evaluation Apparatus Flow Tester CFT-500D" is taken as the softening point. The melting temperature in the 1/2 method is calculated in the following manner. First, a half of the difference between the descent amount of Smax of the piston at the end of the outflow and the descent amount Smin of the piston at the start of the outflow is determined (this is taken as X. X=(Smax−Smin)/2). The temperature at the time the descent amount of the piston in the flow curve is the sum of X and Smin is the melting temperature in the 1/2 method.

The measurement sample is prepared by compression molding 1.0 g of the resin into a cylinder with a diameter of 8 mm at 10 MPa for 60 sec under an environment at 25° C. by using a tablet press (for example, NT-100H, manufactured by NPA Systems Inc.).

The measurement conditions of CFT-500D are as follows.
Test mode: temperature rising method
Starting temperature: 50° C.
Reached temperature: 200° C.
Measurement interval: 1.0° C.
Heating rate: 4.0° C./min
Piston cross-sectional area: 1.000 $cm^2$
Test load (piston load): 10.0 $kgf/cm^2$ (0.9807 MPa)
Preheating time: 300 sec
Die hole diameter: 1.0 mm
Die length: 1.0 mm Measurement of the Glass Transition Temperature (Tg) of the Binder Resin and the Polyolefin Resin Having Sulfonic Acid Groups The glass transition temperature and the melting peak temperature are measured according to ASTM D3418-82 by using a differential scanning calorimeter "Q2000" (manufactured by TA Instruments). The melting points of indium and zinc are used for temperature correction of the device detection unit, and the melting heat of indium is used for correction of heat quantity. Specifically, measurements are performed under the following conditions by accurately weighing 3 mg of a resin, placing the sample in an aluminum pan, and using an empty aluminum pan as a reference.
Temperature rise rate: 10° C./min
Measurement start temperature: 30° C.
Measurement end temperature: 180° C.

The measurement is performed in a measurement range of 30° C. to 100° C. at a temperature rise rate of 10° C./min. The temperature is raised to 180° C. and held for 10 min, and then the temperature is lowered to 30° C., and thereafter the temperature is raised again. In the second temperature raising process, a change in specific heat is obtained in the temperature range of 30° C. to 100° C. The intersection point of the line at the midpoint between the baselines before and after the specific heat change at this time and the differential thermal curve is taken as a glass transition temperature (Tg).

Method for Measuring Average Circularity of Toner Particle

The average circularity of the toner particle is measured with a flow-type particle image analyzer "FPIA-3000" (manufactured by Sysmex Corp.) under the same measurement and analysis conditions as at the time of calibration operation. The principle of measurement with the flow-type particle image meter "FPIA-3000" (manufactured by Sysmex Corp.) is in capturing an image of a flowing particle as a static image and performing image analysis. The sample added to a sample chamber is taken by a sample suction syringe and fed to a flat sheath flow cell. The sample fed to the flat sheath flow forms a flat flow sandwiched by sheath fluid. The sample passing through the flat sheath flow cell is irradiated by stroboscopic light at intervals of 1/60 sec, and the image of the flowing particle can be captured as a static image. Further, since the flow is flat, focused images are captured. The image of a particle is captured by a CCD camera and the captured image is processed at an image processing resolution of 512×512 pixels (0.37 μm×0.37 μm per pixel) and a projected area S and a perimeter L of a particle image are measured by extracting the contour of each particle image.

Next, the circle-equivalent diameter and circularity are obtained by using the area S and perimeter L. The circle-equivalent diameter refers to the diameter of a circle having the same area as the projected area of a particle image. The circularity is defined as a value obtained by dividing the perimeter of the circle obtained based on the circle-equivalent diameter by the perimeter of the particle projection image and calculated by the following equation.

$$\text{Circularity}=2\times(\pi\times S)^{1/2}/L.$$

When a particle image is perfect circle, the circularity is 1.000. As the degree of unevenness of the periphery of a particle image increases, the circularity decreases. After the circularity of each particle has been calculated, and an arithmetic mean value of the obtained circularities is calculated and taken as the average circularity.

The specific measurement method is as follows.

Initially, about 20 mL of ion exchanged water from which solid impurities and the like have been removed in advance is placed in a glass container. Then, about 0.2 mL of a diluted solution prepared by diluting "CONTAMINON N" (a 10 mass % aqueous solution of a neutral detergent which has pH of 7 and used for washing precision measurement devices, the neutral detergent including a nonionic surfactant, an anionic surfactant, and an organic builder; manufactured by Wako Pure Chemical Industries, Ltd.) about 3 mass times with ion exchanged water is added as a dispersing agent thereto.

About 0.02 g of the measurement sample is then added, and dispersion treatment is performed for 2 min with an ultrasonic disperser to obtain a dispersion liquid for measurements. At that time, the dispersion liquid is suitably cooled such that the temperature thereof is from 10° C. to 40° C. A prescribed amount of ion exchanged water is placed in a water tank followed by the addition of about 2 mL of the CONTAMINON N to the water tank by using a desktop ultrasonic cleaner/disperser having an oscillation frequency of 50 kHz and an electrical output of 150 W ("VS-150" (manufactured by Velvo-Clear Co., Ltd.)) as the ultrasonic disperser.

During the measurements, the aforementioned flow particle image analyzer equipped with a standard objective lens (magnification factor: 10 times) is used, and the Particle Sheath "PSE-900A" (manufactured by Sysmex Corp.) is used for the sheath liquid. The dispersion liquid prepared in accordance with the aforementioned procedure is introduced into the flow particle image analyzer and 3000 toner particles are counted in the HPF measurement mode using the total count mode.

The average circularity of the toner particle is determined by setting the binarized threshold during particle analysis to 85% and limiting the analyzed particle diameter to a circle-equivalent diameter of from 1.98 m to 39.69 m.

In the course of the measurements, focus is adjusted automatically using standard latex particles prior to the start of the measurements ("RESEARCH AND TEST PARTICLES, Latex Microsphere Suspensions 5200A" manufactured by Duke Scientific Corp.). Subsequently, focus is preferably adjusted every 2 h after the start of the measurements.

Separation of the Polyolefin Resin from Toner, and Measurement of the Content Ratio of Vinyl Polymer and Monomer Units Having a Sulfonic Acid Group in the Polyolefin Resin The polyolefin resin of the toner is separated in accordance with the method below, to allow identifying the content ratio of monomer units having a sulfonic acid group and of the vinyl polymer in the polyolefin resin. Specifically, the release agent is extracted from the toner by Soxhlet extraction using a hexane solvent, so that just the polyolefin resin alone can be separated thereafter, on the basis of the solubility difference of the polyester resin and the polyolefin resin towards the solvent.

Concrete examples in which the polyolefin resin alone is extracted include a method in which the polyolefin resin alone is isolated, as a residue, by Soxhlet extraction with an ethyl acetate/1-propanol mixed solvent (mass ratio 8:2). The content can then be identified by thoroughly drying the residue and measuring the mass of the dry residue. This may be further accompanied with an NMR measurement in order to ascertain the molecular structure of the polyolefin resin that is the extraction residue.

EXAMPLES

The present invention will be explained next in further detail on the basis of examples and comparative examples, but implementations of the present invention are not limited to these examples. In the examples and comparative examples, numerical values of "parts" are based on parts by mass in all instances, unless otherwise noted.

Production Example of Polyolefin Resin 1

Herein 300.0 parts of xylene and 10.0 parts of polypropylene (melting point 81° C.) were thoroughly dissolved in an autoclave reaction vessel equipped with a thermometer and a stirrer, and after purging with nitrogen, a mixed solution of 74.7 parts of styrene, 0.9 parts of 2-acrylamide-2-methylpropanesulfonic acid, 3.6 parts of cyclohexyl methacrylate, 10.8 parts of butyl acrylate and 250.0 parts of xylene was added dropwise at 180° C. over 3 hours, to elicit polymerization. Once the polymerization reaction was over, the obtained mixed solution was cooled.

A mixed solution of 4.0 parts of a 10 mol/L aqueous solution of lithium hydroxide and 16.0 parts of tetrahydrofuran was added dropwise, and the whole was kept at that temperature for 30 minutes, to elicit neutralization. This was followed by solvent removal, to yield Polyolefin resin 1. The content ratio of the various monomer units are given in Table 1.

Production Examples of Polyolefin Resins 2 to 6

Polyolefin resins 2 to 6 were obtained by performing the same operation as in the production example of Polyolefin resin 1, but herein 2-acrylamide-2-methylpropanesulfonic acid and butyl acrylate in the production example of Polyolefin resin 1 were modified as given in Table 1. The content ratio of the various monomer units is given in Table 1.

Polyolefin resin 6 was produced in accordance with the same operation as in the production example of Polyolefin resin 1, but without adding 2-acrylamide-2-methylpropanesulfonic acid.

TABLE 1

| Poly-olefin resin No. | Polyolefin Polypropylene Parts | Vinyl polymer unit | | | | | | | |
|---|---|---|---|---|---|---|---|---|---|
| | | Styrene | | AMPS | | Cyclohexyl methacrylate | | Butyl acrylate | |
| | | Parts | mass % | Parts | mass % | Parts | mass % | Parts | mass % |
| 1 | 10.0 | 74.7 | 83.0 | 0.9 | 1.0 | 3.6 | 4.0 | 10.8 | 12.0 |
| 2 | 10.0 | 70.9 | 78.8 | 4.3 | 4.8 | 3.4 | 3.8 | 11.3 | 12.6 |
| 3 | 10.0 | 65.2 | 72.4 | 9.2 | 10.2 | 3.8 | 4.2 | 11.9 | 13.2 |
| 4 | 10.0 | 56.4 | 62.7 | 17.6 | 19.6 | 3.9 | 4.3 | 12.1 | 13.4 |
| 5 | 10.0 | 50.6 | 56.2 | 21.6 | 24.0 | 5.0 | 5.6 | 12.8 | 14.2 |
| 6 | 10.0 | 77.0 | 85.6 | 0.0 | 0.0 | 2.9 | 3.2 | 10.1 | 11.2 |

In the table, AMPS denotes 2-acrylamide-2-methylpropanesulfonic acid. The language "mass %" denotes the content ratio of monomer units derived from the various monomers in the vinyl polymer.

Production Example of Amorphous Resin 1

Polyoxypropylene(2.2)-2,2-bis (4-hydroxyphenyl)propane: 73.8 parts (0.19 molar parts; 100.0 mol % relative to total number of moles of polyhydric alcohol)
Terephthalic acid:
12.5 parts (0.08 molar parts; 48.0 mol % relative to total number of moles of polyvalent carboxylic acid)
Adipic acid:
7.8 parts (0.05 molar parts; 34.0 mol % relative to total number of moles of polyvalent carboxylic acid)
Titanium tetrabutoxide (esterification catalyst): 0.5 parts The above materials were weighed in a reaction vessel equipped with a cooling tube, a stirrer, a nitrogen introduction tube and a thermocouple. Next, the interior of the reaction vessel was purged with nitrogen gas, and thereafter the temperature was gradually raised while under stirring; the reaction was conducted for 2 hours while under stirring at a temperature of 200° C.

Thereafter, the pressure in the reaction vessel was lowered to 8.3 kPa, and this state was maintained for 1 hour, followed by cooling down to 160° C., and return to atmospheric pressure (first reaction step).
Trimellitic acid:
5.9 parts (0.03 molar parts; 18.0 mol % relative to total number of moles of polyvalent carboxylic acid)
tert-butyl catechol (polymerization inhibitor): 0.1 parts Thereafter, the above materials were added, the pressure in the reaction vessel was lowered to 8.3 kPa, and the reaction was conducted for 15 hours while the temperature was maintained at 200° C.; once the softening point proved to have reached 120° C. in a measurement according to ASTM D36-86, the temperature was lowered to stop the reaction (second reaction step), and obtain Amorphous resin 1.

The obtained Amorphous resin 1 had a peak molecular weight Mp of 10000, a softening point Tm of 110° C. and a glass transition temperature Tg of 60° C.

Production Example of Amorphous Resin 2

Polyoxyethylene(2.2)-2,2-bis (4-hydroxyphenyl)propane: 73.8 parts (0.19 molar parts; 100.0 mol % relative to total number of moles of polyhydric alcohol)
Terephthalic acid:
12.5 parts (0.08 molar parts; 48.0 mol % relative to total number of moles of polyvalent carboxylic acid)
Adipic acid:
7.8 parts (0.05 molar parts; 34.0 mol % relative to total number of moles of polyvalent carboxylic acid)
Titanium tetrabutoxide (esterification catalyst): 0.5 parts The above materials were weighed in a reaction vessel equipped with a cooling tube, a stirrer, a nitrogen introduction tube and a thermocouple. Next, the interior of the reaction vessel was purged with nitrogen gas, and thereafter the temperature was gradually raised while under stirring; the reaction was conducted for 2.5 hours while under stirring at a temperature of 200° C.

Thereafter, the pressure in the reaction vessel was lowered to 8.4 kPa, and this state was maintained for 1 hour, followed by cooling down to 160° C., and return to atmospheric pressure (first reaction step).
Trimellitic acid:
5.9 parts (0.03 molar parts; 18.0 mol % relative to total number of moles of polyvalent carboxylic acid)
tert-butyl catechol (polymerization inhibitor): 0.1 parts Thereafter, the above materials were added, the pressure in the reaction vessel was lowered to 8.3 kPa, and the reaction was conducted for 15 hours while the temperature was maintained at 205° C.; once the softening point proved to have reached 120° C. in a measurement according to ASTM D36-86, the temperature was lowered to stop the reaction (second reaction step), and obtain Amorphous resin 2. The obtained Amorphous resin 2 had a peak molecular weight Mp of 10000, a softening point Tm of 109° C. and a glass transition temperature Tg of 60.5° C.

| Production Example of Toner 1 | |
|---|---|
| Amorphous resin 1: | 65 parts |
| Amorphous resin 2: | 35 parts |
| Polyolefin resin 1: | 8 parts |
| Fischer-Tropsch wax (hydrocarbon wax; peak temperature of maximum endothermic peak = 90° C.): | 8 parts |
| C.I. Pigment blue 15:3: | 7 parts |
| Aluminum 3,5-di-t-butylsalicylate compound (Bontron E88, by Orient Chemical Industries Co., Ltd.): | 0.3 parts |

The above materials were mixed using a Henschel mixer (FM-75 Model, by Mitsui Mining Co., Ltd.) at a rotation speed of 20 s$^{-1}$ and over a rotation time of 5 min, followed by kneading using a twin-screw kneader (PCM-30 Model, by Ikegai Corp). The barrel temperature at the time of kneading was set so that the outlet temperature of the kneaded product was 120° C. The outlet temperature of the kneaded product was directly measured using a handy-type thermometer (HA-200E, by Anritsu Meter Co., Ltd.).

The obtained kneaded product was cooled, and was coarsely pulverized to 1 mm or less, using a hammer mill, to yield a crushed product. The obtained crushed product was finely pulverized using a mechanical pulverizer (T-250, by Turbo Kogyo Co., Ltd.). The resulting product was classified using FACULTY F-300 (by Hosokawa Micron Corporation), to yield Toner particle 1. The operation conditions were set to a classification rotor speed of 130 s$^{-1}$, and a dispersion rotor speed of 120 s$^{-1}$.

A thermal treatment was performed using the obtained Toner particle 1, in the surface treatment device illustrated in the FIGURE, to thereby obtain a thermally treated particle of Toner particle 1. The operation conditions involved setting a feed amount=5 kg/hr, hot air current temperature=150° C., hot air current flow rate=6 m$^3$/min, cold air temperature=−5° C., cold air flow rate=4 m$^3$/min, blower air volume=20 m$^3$/min and injection air flow rate=1 m$^3$/min.

Then 1.0 part of hydrophobic silica (BET: 200 m$^2$/g) and 1.0 part of titanium oxide fine particles (BET: 80 m$^2$/g) surface-treated with isobutyl trimethoxysilane, relative to 100 parts of the obtained thermally treated particle of Toner particle 1, were mixed in a Henschel mixer (FM-75 Model, by Mitsui Mining Co., Ltd.) at a rotational speed of 30 s$^{-1}$ and over a rotation time of 10 min, to yield Toner 1.

Production Example of Toner 2

Toner 2 was obtained by performing the same operation as in the production example of Toner 1, but modifying herein Polyolefin resin 1 in production example of Toner 1 to Polyolefin resin 4.

Production Example of Toner 3

| | |
|---|---|
| Amorphous resin 1: | 65 parts |
| Amorphous resin 2: | 35 parts |
| Polyolefin resin 2: | 8 parts |
| Fischer-Tropsch wax (hydrocarbon wax; peak temperature of maximum endothermic peak = 90° C.): | 8 parts |
| C.I. Pigment blue 15:3: | 7 parts |
| Aluminum 3,5-di-t-butylsalicylate compound (Bontron E88, by Orient Chemical Industries Co., Ltd.): | 0.3 parts |

The above materials were mixed using a Henschel mixer (FM-75 Model, by Mitsui Mining Co., Ltd.) at a rotation speed of 20 s$^{-1}$ and over a rotation time of 5 min, followed by kneading using a twin-screw kneader (PCM-30 Model, by Ikegai Corporation). The barrel temperature at the time of kneading was set so that the outlet temperature of the kneaded product was 120° C. The outlet temperature of the kneaded product was directly measured using a handy-type thermometer (HA-200E, by Anritsu Meter Co., Ltd.).

The obtained kneaded product was cooled, and was coarsely pulverized to 1 mm or less, using a hammer mill, to yield a crushed product. Then Kneaded crushed product was finely pulverized using a mechanical pulverizer (T-250, by Turbo Kogyo Co. Ltd.), at operation conditions that involved a rotor speed of 12000 rpm. Then classification was carried out under operation conditions of classification rotor speed of 9000 rpm and dispersion rotor speed of 7200 rpm, using FACULTY (F-300, by Hosokawa Micron Corporation), to yield Small-sized toner particle F2 containing Polyolefin resin 2.

Next, the materials below were mixed using a Henschel mixer (FM-75 Model, by Mitsui Mining Co., Ltd.) at a rotation speed of 20 s$^{-1}$ and over a rotation time of 5 min, followed by kneading using a twin-screw kneader (PCM-30 Model, by Ikegai Corporation). The barrel temperature at the time of kneading was set so that the outlet temperature of the kneaded product was 120° C.

| | |
|---|---|
| Amorphous resin 1: | 65 parts |
| Amorphous resin 2: | 35 parts |
| Polyolefin resin 1: | 8 parts |
| Fischer-Tropsch wax (hydrocarbon wax; peak temperature of maximum endothermic peak = 90° C.): | 8 parts |
| C.I. Pigment blue 15:3: | 7 parts |
| Aluminum 3,5-di-t-butylsalicylate compound (Bontron E88, by Orient Chemical Industries Co., Ltd.): | 0.3 parts |

The barrel temperature at the time of kneading was set so that the outlet temperature of the kneaded product was 120° C. The outlet temperature of the kneaded product was directly measured using a handy-type thermometer (HA-200E, by Anritsu Meter Co., Ltd.).

The obtained kneaded product was cooled, and was coarsely pulverized to 1 mm or less, using a hammer mill, to yield a crushed product. Then pulverization classification was carried out with the operation conditions of the mechanical pulverizer set to a rotor speed of 10000 rpm and the operation conditions of FACULTY set to classification rotor speed of 8000 rpm and dispersion rotor speed of 7200 rpm, to yield Large-sized toner particle M1 containing Polyolefin resin 1.

The obtained Small-sized toner particle F2 containing Polyolefin resin 2 and Large-sized toner particle M1 containing Polyolefin resin 1 were mixed at a mass ratio of 1:1. A thermal treatment was then performed using the surface treatment device illustrated in the FIGURE, to thereby obtain a thermally treated particle of Toner particle 3.

The operation conditions involved setting a feed amount=5 kg/hr, hot air current temperature=150° C., hot air current flow rate=6 m$^3$/min, cold air temperature=−5° C., cold air flow rate=4 m$^3$/min, blower air volume=20 m$^3$/min and injection air flow rate=1 m$^3$/min.

Then 1.0 part of hydrophobic silica fine particles (BET: 200 m$^2$/g) and 1.0 part of titanium oxide fine particles (BET: 80 m$^2$/g) surface-treated with isobutyl trimethoxysilane, relative to 100 parts of the obtained thermally treated particle of the toner particle mixture, were mixed in a Henschel mixer (FM-75 Model, by Mitsui Mining Co., Ltd.) at a rotational speed of 30 s- and over a rotation time of 10 min, to yield Toner 3.

Production Example of Toner 4

Herein Toner 4 was obtained by performing the same operations of production example of Toner 3 but modifying Polyolefin resin 2 in the production example of Toner 3 to Polyolefin resin 3, and by mixing Small-sized toner particle F3 containing Polyolefin resin 3 and Large-sized toner particle M1 containing Polyolefin resin 1.

Production Example of Toner 5

Herein Toner 5 was obtained by performing the same operations of production example of Toner 3 but modifying Polyolefin resin 2 in the production example of Toner 3 to Polyolefin resin 4, and by mixing Small-sized toner particle F4 containing Polyolefin resin 4 and Large-sized toner particle M1 containing Polyolefin resin 1.

| Production Example of Toner 6 | |
|---|---|
| Amorphous resin 1: | 65 parts |
| Amorphous resin 2: | 35 parts |
| Polyolefin resin 4: | 8 parts |
| Fischer-Tropsch wax (hydrocarbon wax; peak temperature of maximum endothermic peak = 90° C.): | 16 parts |
| C.I. Pigment blue 15:3: | 7 parts |
| Aluminum 3,5-di-t-butylsalicylate compound (BONTRON E88, by Orient Chemical Industries Co., Ltd.): | 0.3 parts |

The above materials were mixed using a Henschel mixer (FM-75 Model, by Mitsui Mining Co., Ltd.) at a rotation speed of 20 s$^{-1}$ and over a rotation time of 5 min, followed by kneading using a twin-screw kneader (PCM-30 Model, by Ikegai Corp). The barrel temperature at the time of kneading was set so that the outlet temperature of the kneaded product was 120° C. The outlet temperature of the kneaded product was directly measured using a handy-type thermometer (HA-200E, by Anritsu Meter Co., Ltd.).

The obtained kneaded product was cooled, and was coarsely pulverized to 1 mm or less, using a hammer mill, to yield a crushed product. Then Kneaded crushed product was finely pulverized using a mechanical pulverizer (T-250, by Turbo Kogyo Co. Ltd.), at operation conditions that involved a rotor speed of 12000 rpm. Then classification was carried out using FACULTY (F-300, by Hosokawa Micron Corporation) under operation conditions of classification rotor speed of 9000 rpm and dispersion rotor speed of 7200 rpm, to yield Small-sized toner particle F4-2 containing Polyolefin resin 4.

Next, the materials below were mixed using a Henschel mixer (FM-75 Model, by Mitsui Mining Co., Ltd.) at a rotation speed of 20 s$^{-1}$ and over a rotation time of 5 min, followed by kneading using a twin-screw kneader (PCM-30 Model, by Ikegai Corporation). The barrel temperature at the time of kneading was set so that the outlet temperature of the kneaded product was 120° C.

| | |
|---|---|
| Amorphous resin 1: | 65 parts |
| Amorphous resin 2: | 35 parts |
| Polyolefin resin 1: | 8 parts |
| Fischer-Tropsch wax (hydrocarbon wax; peak temperature of maximum endothermic peak = 90° C.): | 8 parts |
| C.I. Pigment blue 15:3: | 7 parts |
| Aluminum 3,5-di-t-butylsalicylate compound (Bontron E88, by Orient Chemical Industries Co., Ltd.): | 0.3 parts |

The barrel temperature at the time of kneading was set so that the outlet temperature of the kneaded product was 120° C. The outlet temperature of the kneaded product was directly measured using a handy-type thermometer (HA-200E, by Anritsu Meter Co., Ltd.).

The obtained kneaded product was cooled, and was coarsely pulverized to 1 mm or less, using a hammer mill, to yield a crushed product. Then pulverization classification was carried out with the operation conditions of the mechanical pulverizer set to a rotor speed of 10000 rpm and the operation conditions of FACULTY set to classification rotor speed of 8000 rpm and dispersion rotor speed of 7200 rpm, to yield Large-sized toner particle M1-2 containing Polyolefin resin 1.

Then Small-sized toner particle F4-2 containing Polyolefin resin 4 and Large-sized toner particle M1-2 containing Polyolefin resin 1 obtained above were mixed at a mass ratio of 1:1. A thermal treatment was then performed using the surface treatment device illustrated in the FIGURE, to thereby obtain a thermally treated particle of Toner particle 6.

The operation conditions involved setting a feed amount=5 kg/hr, hot air current temperature=150° C., hot air current flow rate=6 m$^3$/min, cold air temperature=−5° C., cold air flow rate=4 m$^3$/min, blower air volume=20 m$^3$/min and injection air flow rate=1 m$^3$/min.

Then 1.0 part of hydrophobic silica (BET: 200 m$^2$/g) and 1.0 part of titanium oxide fine particles (BET: 80 m$^2$/g) surface-treated with isobutyl trimethoxysilane, relative to 100 parts of the obtained thermally treated particle of the toner particle mixture were mixed in a Henschel mixer (FM-75 Model, by Mitsui Mining Co., Ltd.) at a rotational speed of 30 s$^{-1}$ and over a rotation time of 10 min, to yield Toner 6.

Production Example of Toner 7

Toner 7 was obtained by performing the same operation of production example of Toner 3, but herein modifying Polyolefin resin 2 in the production example of Toner 3 to Polyolefin resin 1, modifying Polyolefin resin 1 to Polyolefin resin 4, and mixing Small-sized toner particle F1 containing Polyolefin resin 1 and Large-sized toner particle M4 containing Polyolefin resin 4.

Production Example of Toner 8

Toner 8 was obtained by performing the same operation of production example of Toner 3, but herein modifying Polyolefin resin 1 in the production example of Toner 3 to Polyolefin resin 3, and mixing Small-sized toner particle F2 containing Polyolefin resin 2 and Large-sized toner particle M3 containing Polyolefin resin 3.

Production Example of Toner 9

Toner 9 was obtained by performing the same operation of production example of Toner 3, but herein modifying Polyolefin resin 2 in the production example of Toner 3 to Polyolefin resin 5, and mixing Small-sized toner particle F5 containing Polyolefin resin 5 and Large-sized toner particle M1 containing Polyolefin resin 1.

Production Example of Toner 10

Toner 10 was obtained by performing the same operation of production example of Toner 1, but herein modifying Polyolefin resin 1 in the production example of Toner 1 to Polyolefin resin 6.

The obtained Toners 1 to 10 were divided respectively into two substantially equal parts, on a number basis, i.e. into a large particle size side and a small particle size side (to a difference in the numbers of particles of 4% or less) using an Elbow-jet (by Nittetsu Mining Co., Ltd.) of an inertial classification system, to obtain a first group and a second group, and each toner was then evaluated.

The operation conditions of the Elbow-jet were adjusted to feed amount=5 kg/hr, and a fine powder classification edge from 10 to 15 mm, and the coarse powder classification edge was closed at maximum, so that each toner was divided into two substantially equal parts, namely a large particle size toner as the first group and a small particle size toner as the second group. The results are given in Table 2.

TABLE 2

| Toner No. | D50 | Span value | Polyolefin resin No. | Sulfo amount | ATR-IR spectrum As | Bs | As/Bs | Al | Bl | (Al/Bl) | (As/Bs)/(Al/Bl) |
|---|---|---|---|---|---|---|---|---|---|---|---|
| 1 | 4.3 | 2.5 | 1 | 1.0 | 0.18 | 0.16 | 1.11 | 0.13 | 0.13 | 1.02 | 1.08 |
| 2 | 7.6 | 1.9 | 4 | 19.6 | 0.33 | 0.19 | 1.75 | 0.24 | 0.17 | 1.47 | 1.19 |
| 3 | 6.7 | 0.7 | 1 + 2 | 2.9 | 0.19 | 0.13 | 1.48 | 0.13 | 0.13 | 1.02 | 1.44 |
| 4 | 6.3 | 1.5 | 1 + 3 | 5.6 | 0.23 | 0.12 | 1.84 | 0.13 | 0.13 | 1.02 | 1.80 |
| 5 | 5.5 | 1.5 | 1 + 4 | 10.3 | 0.33 | 0.19 | 1.75 | 0.13 | 0.13 | 1.02 | 1.71 |
| 6 | 4.7 | 1.5 | 1 + 4 | 10.3 | 0.37 | 0.19 | 1.97 | 0.13 | 0.13 | 1.02 | 1.93 |
| 7 | 4.5 | 2.7 | 4 + 1 | 10.3 | 0.18 | 0.16 | 1.11 | 0.24 | 0.17 | 1.47 | 0.75 |
| 8 | 4.0 | 2.0 | 2 + 3 | 7.5 | 0.23 | 0.12 | 1.84 | 0.25 | 0.14 | 1.82 | 1.01 |
| 9 | 3.5 | 3.0 | 1 + 5 | 12.5 | 0.39 | 0.19 | 2.11 | 0.13 | 0.13 | 1.02 | 2.06 |
| 10 | 5.5 | 3.2 | 6 | — | 0 | 0 | 0 | 0 | 0 | 0 | 0 |

In the table, Sulfo amount denotes the content ratio (mass %) of monomer units containing a sulfonic acid group, in the vinyl polymer of the polyolefin resin having sulfonic acid groups. Further, D50 denotes the number-basis median diameter (μm) of the toner, while Span value denotes a span value obtained in accordance with Expression (2).

Production Example of Magnetic Core Particle 1

| Step 1 (weighing and mixing step): | |
|---|---|
| Fe$_2$O$_3$ | 62.7 parts |
| MnCO$_3$ | 29.5 parts |
| Mg(OH)$_2$ | 6.8 parts |
| SrCO$_3$ | 1.0 part |

The above materials were weighed so as to obtain the above composition ratio. Thereafter, the materials were pulverized and mixed for 5 h with a dry vibration mill using stainless steel beads having a diameter of ⅛ inch.

Step 2 (Pre-Baking Step):

The pulverized product obtained was made into about 1 mm square pellets with a roller compactor. This pellets were subjected to removal of coarse powder with a vibrating sieve having a mesh size of 3 mm, and then fine powder was removed with a vibrating sieve having a mesh size of 0.5 mm. A pre-baked ferrite was prepared by baking at a temperature of 1000° C. for 4 h under a nitrogen atmosphere (oxygen concentration: 0.01% by volume) by using a burner-type baking furnace. The obtained pre-baked ferrite had the following composition.

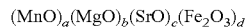

$$(MnO)_a(MgO)_b(SrO)_c(Fe_2O_3)_d$$

In the above formula, a=0.257, b=0.117, c=0.007, and d=0.393.

Step 3 (Pulverization Step):

After pulverizing the pre-baked ferrite to about 0.3 mm with a crusher, 30 parts of water was added to 100 parts of the pre-baked ferrite and pulverization was carried out for 1 h by using a wet ball mill with zirconia beads having a diameter of ⅛ inch. The obtained slurry was pulverized with a wet ball mill using alumina beads having a diameter of 1/16 inch for 4 h to obtain a ferrite slurry (finely pulverized product of pre-baked ferrite).

Step 4 (Granulation Step):

A total of 1.0 part of ammonium polycarboxylate as a dispersing agent and 2.0 parts of polyvinyl alcohol as a binder were added, with respect to 100 parts of the pre-baked ferrite, to the ferrite slurry, followed by granulation into spherical particles with a spray drier (manufacturer: Ohkawara Kakohki Co., Ltd.). The obtained particles were adjusted in particle size and then heated at 650° C. for 2 h using a rotary kiln to remove organic components of the dispersing agent and the binder.

Step 5 (Baking Step):

In order to control the baking atmosphere, the temperature was raised in an electric furnace from room temperature to 1300° C. under a nitrogen atmosphere (oxygen concentration 1.00% by volume) in 2 h and then baking was carried out at a temperature of 1150° C. for 4 h. The temperature was then lowered to 60° C. over 4 h, the air atmosphere was restored from the nitrogen atmosphere, and the particles were taken out at a temperature of 40° C. or lower.

Step 6 (Screening Step):

After disaggregating the aggregated particles, a low-magnetic-force product was cut by magnetic separation, and the coarse particles were removed by sieving with a sieve having a mesh size of 250 m to obtain magnetic core particles 1 having a 50% particle diameter (D50) based on volume distribution of 37.0 m.

Preparation of Coating Resin 1

Cyclohexyl methacrylate monomer: 26.8 mass %

Methyl methacrylate monomer: 0.2 mass %

Methyl methacrylate macromonomer (macromonomer of weight-average molecular weight of 5000 and having a methacryloyl group in one terminus): 8.4 mass %

Toluene: 31.3 mass %

Methyl ethyl ketone: 31.3 mass %

Azobisisobutyronitrile: 2.0 mass %

The cyclohexyl methacrylate monomer, the methyl methacrylate monomer, the methyl methacrylate macromonomer, toluene, and methyl ethyl ketone, from among above materials, were charged in a four-necked separable flask equipped with a reflux condenser, a thermometer, a nitrogen introduction tube, and a stirrer, and nitrogen gas was introduced, to sufficiently create a nitrogen atmosphere. This was followed by warming up to 80° C., addition of azobisisobutyronitrile, and polymerization while under reflux for 5 hours. Hexane was added to the obtained reaction product, to cause a copolymer to precipitate; the resulting precipitate was separated by filtration and was then vacuum-dried, to yield Coating resin 1.

Next, 30 parts of Coating resin 1 were dissolved in 40 parts of toluene and 30 parts of methyl ethyl ketone, to yield Polymer solution 1 (solids: 30 mass %).

Preparation of Coating Resin Solution 1

Polymer solution 1 (resin solid fraction concentration: 30% by mass) 33.3% by mass
Toluene 66.4% by mass
Carbon black (Regal 330; manufactured by Cabot Corporation) 0.3% by mass (primary particle diameter 25 nm, nitrogen adsorption specific surface area 94 m²/g, DBP oil absorption amount 75 ml/100 g)

The abovementioned materials were dispersed for 1 h with a paint shaker using zirconia beads having a diameter of 0.5 mm. The resulting dispersion was filtered with a membrane filter of 5.0 m to obtain a coating resin solution 1.

Production Example of Magnetic Carrier 1

Resin Coating Step:

The magnetic core particles 1 and the coating resin solution 1 were loaded into a vacuum degassing type kneader maintained at normal temperature (the loaded amount of the coating resin solution 1 was 2.5 parts as a resin component with respect to 100 parts of the magnetic core particles 1). After loading, the components were stirred at a revolution speed of 30 rpm for 15 min. After the solvent was volatilized to a certain extent (80% by mass) or more, the temperature was raised to 80° C. while mixing under reduced pressure, and toluene was distilled off over 2 h, followed by cooling. The obtained magnetic carrier was subjected to fractionation of a low-magnetic-force product by magnetic separation, sieving with a sieve having a mesh size of 70 m, and classification with an air classifier to obtain a magnetic carrier 1 having a 50% particle diameter (D50) based on volume distribution of 38.2 m.

Production Example of Two-Component Developer 1

Two-component developer 1 was obtained through mixing of 92.0 parts of Magnetic carrier 1 and 8.0 parts of Toner 1 in a V-type mixer (V-20, by Swishing Enterprise Co., Ltd.).

Production Example of Two-Component Developers 2 to 10

Two-component developers 2 to 10 were obtained by performing the same operation as in the production example of Two-component developer 1, but modifying herein Toner 1 to Toners 2 to 10, respectively.

Example 1

The evaluations below were carried out using the above Two-component developer 1. A modified machine of a digital commercial printer image RUNNER ADVANCE C5560, by Canon Inc., was used as the image forming apparatus. The apparatus was modified so that fixation temperature, process speed, DC voltage $V_{DC}$ of the developer carrier, charging voltage $V_D$ of an electrostatic latent image bearing member and laser power could be set freely.

To evaluate image output, an FFh image (solid image) having a desired image ratio was outputted, with $V_{DC}$, $V_D$ and laser power being adjusted in such a manner that the amount of toner on the FFh image was as desired, and then the evaluation below was carried out. The value FFh denotes herein a value obtained by displaying 256 gradations in hexadecimal notation, with 00h as the first of the 256 gradations (white background portion) and FFh as the 256th gradation (solid portion).

Suppression of Fogging

Two-component developer 1 was placed in a black developing device of the above image forming apparatus, the evaluation image was outputted under the following conditions, and suppression of fogging was evaluated.

Paper: CS-680(68.0 g/m²) (by Canon Marketing Japan Inc.)
Evaluation image: 00h image on entire surface of the above A4 paper
Vback: 150 V (adjusted on the basis of the DC voltage $V_{DC}$ of the developer carrier, the charging voltage $V_D$ of the electrostatic latent image bearing member, and laser power)
Test environment: high-temperature high-humidity environment (temperature 30° C./humidity 80% RH (hereafter "H/H")
Fixation temperature: 170° C.
Process speed: 377 mm/sec The fogging value defined below was used as an evaluation index of fogging suppression.

Firstly, an average reflectance Ds (%) of the evaluation paper before being outputted is measured using a reflectometer (REFLECTOMETER MODEL TC-6DS: by Tokyo Denshoku Co., Ltd.). The average reflectance Dr (%) of the outputted evaluation paper is measured. The value calculated on the basis of the expression below is taken as the fogging value. The obtained fogging value was evaluated in accordance with the criteria below. The effect of the present invention was deemed to be achieved for results of C and better.

Fogging value=$Dr(\%)-Ds(\%)$

Evaluation Criteria
A: Fogging value lower than 0.3%
B: Fogging value from 0.3% to less than 0.5%
C: Fogging value from 0.5% to less than 0.8%
D: Fogging value from 0.8% to less than 1.2%
E: Fogging value of 1.2% or higher Transferability
Paper: GF-C081 (81.0 g/m²) (by Canon Marketing Japan Inc.)
Laid-on level of toner on solid image: 0.35 mg/cm²
Primary transfer current: 30 μA
Test environment: normal-temperature, normal-humidity environment: (temperature 23° C./humidity 50% RH)
Process speed: 377 mm/sec Two-component developer 1 was placed in a cyan developing device of the above image forming apparatus and was evaluated as follows.

Untransferred toner remaining on the photosensitive member after primary transfer and the toner prior to primary transfer were each taped and stripped off using a transparent adhesive tape made of polyester. The peeled adhesive tape was affixed to paper, and density was measured using a spectroscopic densitometer 500 series (by X-Rite, Inc.).

Transfer efficiency was calculated on the basis of the expression below, from the image density prior to primary transfer and transfer-residual image density, obtained as described above; transfer efficiency was then evaluated on the basis of the evaluation criteria below. The effect of the present invention was deemed to be achieved for results of C and better.

Transfer efficiency (%)=(image density prior to primary transfer−transfer-residual image density)/(image density prior to primary transfer)×100

Evaluation Criteria
  A: transfer efficiency; 90.0% or higher
  B: transfer efficiency; from 85.0% to less than 90.0%
  C: transfer efficiency; from 80.0% to less than 85.0%
  D: transfer efficiency; less than 80.0%
  Image Density
  Paper: GF-C081 (81.0 g/m$^2$) (by Canon Marketing Japan Inc.)
  Vcontrast (adjusted on the basis of the DC voltage $V_{DC}$ of the developer carrier, the charging voltage $V_D$ of the electrostatic latent image bearing member, and laser power): 350 V
  Evaluation image: 2 cm×5 cm image disposed in the center of the above A4 paper
  Test environment: normal-temperature, normal-humidity environment: temperature 23° C./humidity 50% RH (hereafter "N/N")
  Fixation temperature: 170° C.
  Process speed: 377 mm/sec
  The above evaluation image was outputted and image density was evaluated taking the value of image density as an evaluation index. Image density at the central portion was measured using an X-Rite color reflection densitometer (500 series: by X-Rite Inc.). The obtained values of image density were evaluated in accordance with the criteria below. The effect of the present invention was deemed to be achieved for results of C and better.
Evaluation Criteria
  A: image density value of 1.35 or higher
  B: image density value from 1.30 to less than 1.35
  C: image density value from 1.25 to less than 1.30
  D: image density value less than 1.25
  Image Quality
  Paper: GF-C081 (81.0 g/m$^2$) (by Canon Marketing Japan Inc.)
  Vcontrast (adjusted on the basis of the DC voltage $V_{DC}$ of the developer carrier, the charging voltage $V_D$ of the electrostatic latent image bearing member, and laser power): 300 V
  Evaluation image: 1-dot, 1-space vertical line image disposed in the above A4 paper
  Test environment: normal-temperature, normal-humidity environment: temperature 23° C./humidity 50% RH (hereafter "N/N")
  Fixation temperature: 170° C.
  Process speed: 377 mm/sec
  The above evaluation image was outputted and image quality was evaluated. The evaluation index of image quality adopted herein was a value of Blur (numerical value denoting the blur of a line as defined in ISO 13660). The value of Blur was measured using personal IAS (image analysis system) (by QEA Inc.). The obtained values of Blur were evaluated in accordance with the criteria below. The effect of the present invention was deemed to be achieved for results of C and better.
Evaluation Criteria
  A: Blur value less than 35 μm
  B: Blur value from 35 μm to less than 38 μm
  C: Blur value from 38 μm to less than 41 μm
  D: Blur value of 41 μm or larger Examples 2 to 6 and Comparative Examples 1 to 4

Evaluations similar to those of Example 1 were performed but using herein Two-component developers 2 to 10. Evaluation results are given in Table 3.

TABLE 3

|  | Two-component developer No. | Fogging suppression [%] Rank | Fogging value | Transfer efficiency [%] Rank | Transfer efficiency | Image density [%] Rank | Image density | Image quality [μm] Rank | Blur |
|---|---|---|---|---|---|---|---|---|---|
| Example 1 | 1 | C | 0.7 | C | 83.0 | B | 1.33 | C | 39 |
| Example 2 | 2 | A | 0.2 | B | 86.0 | C | 1.29 | B | 36 |
| Example 3 | 3 | B | 0.3 | B | 87.0 | B | 1.34 | A | 34 |
| Example 4 | 4 | B | 0.4 | B | 88.0 | A | 1.40 | A | 32 |
| Example 5 | 5 | A | 0.1 | A | 95.0 | A | 1.43 | A | 30 |
| Example 6 | 6 | A | 0.2 | A | 93.0 | A | 1.38 | B | 35 |
| Comparative example 1 | 7 | D | 1.1 | D | 76.0 | C | 1.28 | C | 40 |
| Comparative example 2 | 8 | D | 0.9 | C | 82.0 | C | 1.29 | C | 39 |
| Comparative example 3 | 9 | B | 0.4 | B | 87.0 | D | 1.24 | D | 45 |
| Comparative example 4 | 10 | D | 1.0 | D | 79.0 | C | 1.37 | C | 40 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-106192, filed Jun. 19, 2020, which is hereby incorporated by reference herein in its entirety.

What is claimed is:

1. A toner comprising a toner particle, said toner particle comprising:
  a binder resin comprising a polyester resin; and
  a polyolefin resin having a sulfonic acid group, the polyolefin resin being a polymer in which a vinyl polymer is bonded to a polyolefin; and
  a content ratio of a monomer unit containing a sulfonic acid group in the vinyl polymer being 1.0 to 20.0 mass %, wherein
  when the toner is divided using an inertial classification system into a first group having a large particle size and a second group having a small particle size so that the number of toner particles in the first and second groups are substantially equal, $1.10 \leq (As/Bs)/(Al/Bl) \leq 2.00$ where As is a ratio of an intensity of a maximum absorption peak in a range from 1130 to 1170 cm$^{-1}$ assigned to a sulfonic acid group contained in the polyolefin resin with respect to an intensity of a maximum absorption peak in a range from 1713 to 1723 cm$^{-1}$ assigned to carbonyl in the polyester resin in a FT-IR spectrum obtained by measuring the second group by an ATR method using Ge as an ATR crystal where an infrared light incidence angle is 45°, Bs is a ratio of an intensity of a maximum absorption peak in a range from 1130 to 1170 cm$^{-1}$ assigned to a sulfonic acid group contained in the polyolefin resin with respect to an intensity of a maximum absorption peak in a range from 1713 to 1723 cm$^{-1}$ assigned to carbonyl in the polyester resin in a FT-IR spectrum obtained by measuring the second group by an ATR method using diamond as an ATR crystal where an infrared light incidence angle is set to 45°, Al is a ratio of an intensity of a maximum absorption peak in a range from 1130 to 1170 cm$^{-1}$ assigned to a sulfonic acid group contained in the polyolefin resin with respect to an intensity of a maximum absorption peak in a range from 1713 to 1723 cm$^{-1}$ assigned to carbonyl in the polyester resin in a FT-IR spectrum obtained by measuring the first group by an ATR method using Ge as an ATR crystal where an infrared light incidence angle is set to 45°, and Bl is a ratio of an intensity of a maximum absorption peak in a range from 1130 to 1170 cm$^{-1}$ assigned to a sulfonic acid group contained in the polyolefin resin with respect to an intensity of a maximum absorption peak in a range from 1713 to 1723 cm$^{-1}$ assigned to carbonyl in the polyester resin in a FT-IR spectrum obtained by measuring the first group in accordance with an ATR method using diamond as an ATR crystal where an infrared light incidence angle is set to 45°; and the toner has a span value of 1.1 to 2.0 defined as (D90−D10)/D50 when D90 is a particle diameter of the toner at which a cumulative number of particles in increasing order of particle diameter is 90%, D10 is a particle diameter of the toner at which a cumulative number of particles in increasing order of particle diameter is 10%, and a number-basis median diameter D50 of the toner is 3.0 to 6.0 um.

2. The toner according to claim 1, wherein $1.50 \leq (As/Bs)/(Al/Bl) \leq 2.00$.

3. The toner according to claim 1, wherein the monomer unit having a sulfonic acid group is represented by Formula (C)

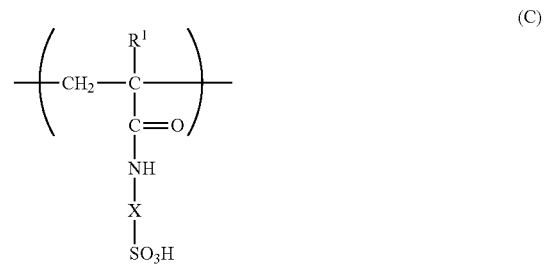

where R$^1$ represents a hydrogen atom or a methyl group, and X represents a linear or branched C1 to C8 alkylene group.

4. The toner according to claim 1, wherein the polyester resin is amorphous.

5. The toner according to claim 1, wherein a content ratio of polyolefin in the polyolefin resin is 5.0 to 20.0 mass %.

* * * * *